United States Patent
Rowan et al.

(10) Patent No.: US 7,640,149 B2
(45) Date of Patent: Dec. 29, 2009

(54) METHOD SYSTEM AND PROGRAM STORAGE DEVICE FOR OPTIMIZATION OF VALVE SETTINGS IN INSTRUMENTED WELLS USING ADJOINT GRADIENT TECHNOLOGY AND RESERVOIR SIMULATION

(75) Inventors: David Rowan, Abingdon (GB); Kieran Neylon, Middlesex (GB); Ian Pallister, Abingdon (GB); Paul A. Fjerstad, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 787 days.

(21) Appl. No.: 11/294,962

(22) Filed: Dec. 5, 2005

(65) Prior Publication Data
US 2006/0184329 A1    Aug. 17, 2006

Related U.S. Application Data

(60) Provisional application No. 60/636,202, filed on Dec. 15, 2004.

(51) Int. Cl.
G06F 17/10 (2006.01)
G06G 7/48 (2006.01)
(52) U.S. Cl. ............................................. 703/10; 703/2
(58) Field of Classification Search ............. 703/2, 703/10
See application file for complete search history.

(56) References Cited

U.S. PATENT DOCUMENTS
6,230,101 B1  5/2001  Wallis

FOREIGN PATENT DOCUMENTS
WO    WO 99/57418    11/1999

OTHER PUBLICATIONS

Pytlak et al.; Optimal scheduling of reservoir releases during flood: Deterministic optimization problem, part 1, procedure; Journal of Optimization Theory and Applications; 1989; pp. 409-432.*
Pytlak et al.; Optimal scheduling of reservoir releases during flood: Deterministic optimization problem, part 2, case study; Journal of Optimization Theory and Applications; 1989; pp. 433-449.*

* cited by examiner

Primary Examiner—Hugh Jones
(74) Attorney, Agent, or Firm—Osha Liang LLP

(57) ABSTRACT

A new adjoint method for calculating and using adjoint gradients in a Reservoir Simulator comprises: calculating adjoint gradients of an objective function with respect to changes in valve settings taking into account the modeling of pressure drop and fluid flow along a wellbore, and using the adjoint gradients to calculate sensitivities of a reservoir to changes in parameterization of downhole devices and using of these sensitivities in optimal control of the wells to optimize some objective function subject to production constraints.

15 Claims, 14 Drawing Sheets

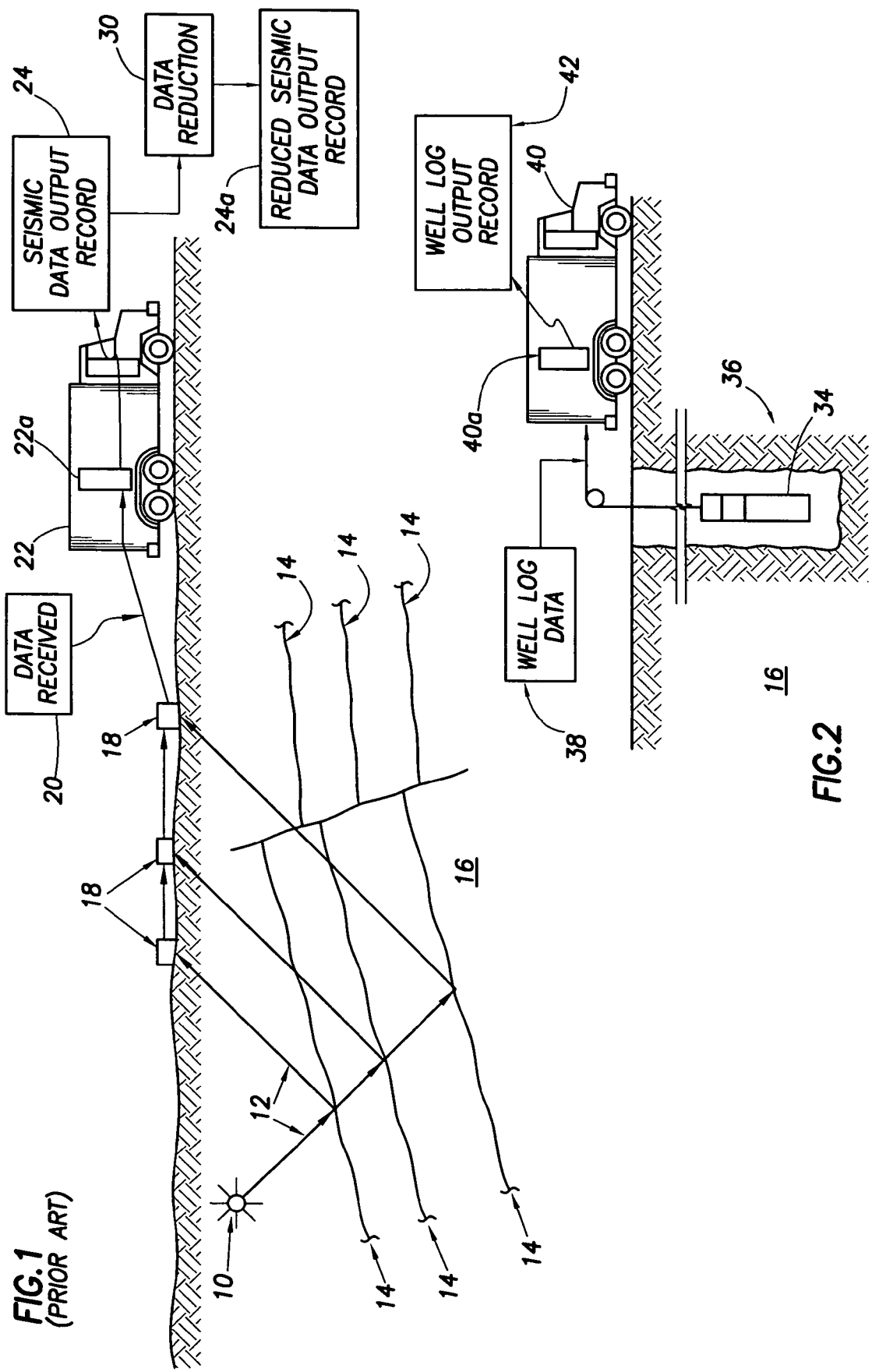

METHOD SYSTEM AND PROGRAM STORAGE DEVICE FOR OPTIMIZATION OF VALVE SETTINGS IN INSTRUMENTED WELLS USING ADJOINT GRADIENT TECHNOLOGY AND RESERVOIR SIMULATION

CROSS REFERENCE TO RELATED APPLICATIONS

This specification is a Utility Application of Provisional Application Ser. No. 60/636,202, filed Dec. 15, 2004, and entitled 'Method Apparatus and System for Optimization of Valve Settings in Instrumented Wells Using Adjoint Gradient Technology and Reservoir Simulation'.

BACKGROUND

The subject matter of this specification relates to a new Adjoint Method (and associated System and Program Storage Device) for Calculating Gradients, and, in particular, to an Adjoint Method for Calculating Gradients of an objective function with respect to changes in valve settings, while taking into account the modeling of pressure drop and fluid flow along a wellbore, for more effectively and efficiently optimizing settings of control valves for reservoir production.

Controllable down-hole devices have made feasible the implementation of advanced well control strategies for achieving an objective, such as maximizing hydrocarbon recovery or net present value. However, the development of algorithms for determining the best strategy for controlling these devices, subject to production and injection constraints, is still an area of active research, and generally involves implementation of some form of control logic within a reservoir simulation workflow.

Some 'control strategies' for controlling these devices are reactive, meaning that interventions are made when local conditions are met at particular wells or valves, without taking into account the future effect of the intervention on the entire reservoir. Moreover, with this approach, it may already be too late to intervene to prevent unwanted breakthrough. These production rule methods tend to be heuristic, but are very efficient in reservoir simulation. Alternative proactive control strategies apply to the lifetime of the field, and thus provide a mechanism to control fluid flow early enough to delay breakthrough. These 'alternative proactive control strategies' for controlling these devices can be divided into at least two methods: (1) 'stochastic' methods, such as Monte Carlo which investigate the effect of a large number of possible strategies, and (2) 'deterministic' methods which set the behavior of each well and valve based on its effect on the objective. This specification includes a 'proactive deterministic constrained optimization method' associated with the aforementioned 'alternative proactive control strategies' adapted for controlling the aforementioned 'controllable downhole devices'. In particular, this specification includes a first application of adjoint gradients to control and optimize settings in a multi-segmented well model.

SUMMARY

One aspect of the 'Adjoint Method of Calculating Gradients' as described in this specification involves a method for calculating and using adjoint gradients in a reservoir simulator, comprising: calculating adjoint gradients of an objective function with respect to changes in valve settings while taking into account a modeling of pressure drop and fluid flow along a wellbore; in response to the calculated adjoint gradients, calculating sensitivities of a reservoir responsive to changes in parameterization of downhole devices; and in response to the calculated sensitivities, using said sensitivities to optimize control of wells in a reservoir by optimizing an objective function.

Another aspect of the 'Adjoint Method of Calculating Gradients' as described in this specification involves a method for optimizing production of a reservoir having one or more wells having valves, comprising: (a) running a reservoir simulator in a forward simulation to simulate the life of the reservoir; (b) processing outputs from the forward simulation to generate intermediate partial derivatives of flow equations for the well and for the reservoir; (c) combining the intermediate partial derivatives of the well flow equations and the reservoir flow equations in the reservoir simulator; (d) solving a large adjoint system of linear equations at regular time intervals to calculate the adjoint gradients of an objective function with respect to the control parameters; (e) determining from the adjoint gradients a search direction; (f) using the search direction to solve an optimization algorithm that maximizes the objective function using line-search methods; (g) locating a local maximum along the search direction and updating control parameters; (h) using the new updated control parameters in the reservoir simulator; and (i) repeating steps (a)-(i) until an optimal value of the objective function has been reached.

Another aspect of the 'Adjoint Method of Calculating Gradients' as described in this specification involves a program storage device readable by a machine tangibly embodying a set of instructions executable by the machine to perform method steps for calculating and using adjoint gradients in a reservoir simulator, said method steps comprising: calculating adjoint gradients of an objective function with respect to changes in valve settings while taking into account a modeling of pressure drop and fluid flow along a wellbore; in response to the calculated adjoint gradients, calculating sensitivities of a reservoir responsive to changes in parameterization of downhole devices; and in response to the calculated sensitivities, using said sensitivities to optimize control of wells in a reservoir by optimizing an objective function.

Another aspect of the 'Adjoint Method of Calculating Gradients' as described in this specification involves a program storage device readable by a machine tangibly embodying a set of instructions executable by the machine to perform method steps for optimizing production of a reservoir having one or more wells having valves, said method steps comprising: (a) running a reservoir simulator in a forward simulation to simulate the life of the reservoir; (b) processing outputs from the forward simulation to generate intermediate partial derivatives of flow equations for the well and for the reservoir; (c) combining the intermediate partial derivatives of the well flow equations and the reservoir flow equations in the reservoir simulator; (d) solving a large adjoint system of linear equations at regular time intervals to calculate the adjoint gradients of an objective function with respect to the control parameters; (e) determining from the adjoint gradients a search direction; (f) using the search direction to solve an optimization algorithm that maximizes the objective function using line-search methods; (g) locating a local maximum along the search direction and updating control parameters; (h) using the new updated control parameters in the reservoir simulator; and (i) repeating steps (a)-(i) until an optimal value of the objective function has been reached.

Another aspect of the 'Adjoint Method of Calculating Gradients' as described in this specification involves a system adapted for calculating and using adjoint gradients in a reservoir simulator, comprising: first apparatus adapted for calculating adjoint gradients of an objective function with respect to changes in valve settings while taking into account a modeling of pressure drop and fluid flow along a wellbore; second apparatus, responsive to the calculated adjoint gradients, adapted for calculating sensitivities of a reservoir responsive to changes in parameterization of downhole devices; and third apparatus, responsive to the calculated sensitivities, adapted for using the sensitivities to optimize control of wells in a reservoir by optimizing an objective function.

Another aspect of the 'Adjoint Method of Calculating Gradients' as described in this specification involves a system adapted for optimizing production of a reservoir having one or more wells having valves, comprising: apparatus adapted for: running a reservoir simulator in a forward simulation to simulate the life of the reservoir; processing outputs from the forward simulation to generate intermediate partial derivatives of flow equations for the well and for the reservoir; combining the intermediate partial derivatives of the well flow equations and the reservoir flow equations in the reservoir simulator; solving an adjoint system of linear equations at regular time intervals to calculate a set of adjoint gradients of an objective function with respect to the control parameters; determining from the adjoint gradients a search direction; using the search direction to solve an optimization algorithm that maximizes the objective function using line-search methods; locating a local maximum along the search direction and updating control parameters; further using the new updated control parameters in the reservoir simulator; and repeating the processing, combining, solving, determining, using, locating, and further using functions performed by the apparatus until an optimal value of the objective function has been reached.

Further scope of applicability will become apparent from the detailed description presented hereinafter. It should be understood, however, that the detailed description and the specific examples set forth below are given by way of illustration only, since various changes and modifications within the spirit and scope of the 'Adjoint Method of Calculating Gradients', as described and claimed in this specification, will become obvious to one skilled in the art from a reading of the following detailed description.

BRIEF DESCRIPTION OF THE DRAWINGS

A full understanding will be obtained from the detailed description presented herein below, and the accompanying drawings which are given by way of illustration only and are not intended to be limitative to any extent, and wherein:

FIG. 1 illustrates a seismic operation for producing a reduced seismic data output record, the seismic operation of FIG. 1 including a data reduction operation;

FIG. 2 illustrates a wellbore operation for producing a well log output record;

DESCRIPTION

Figure 3:
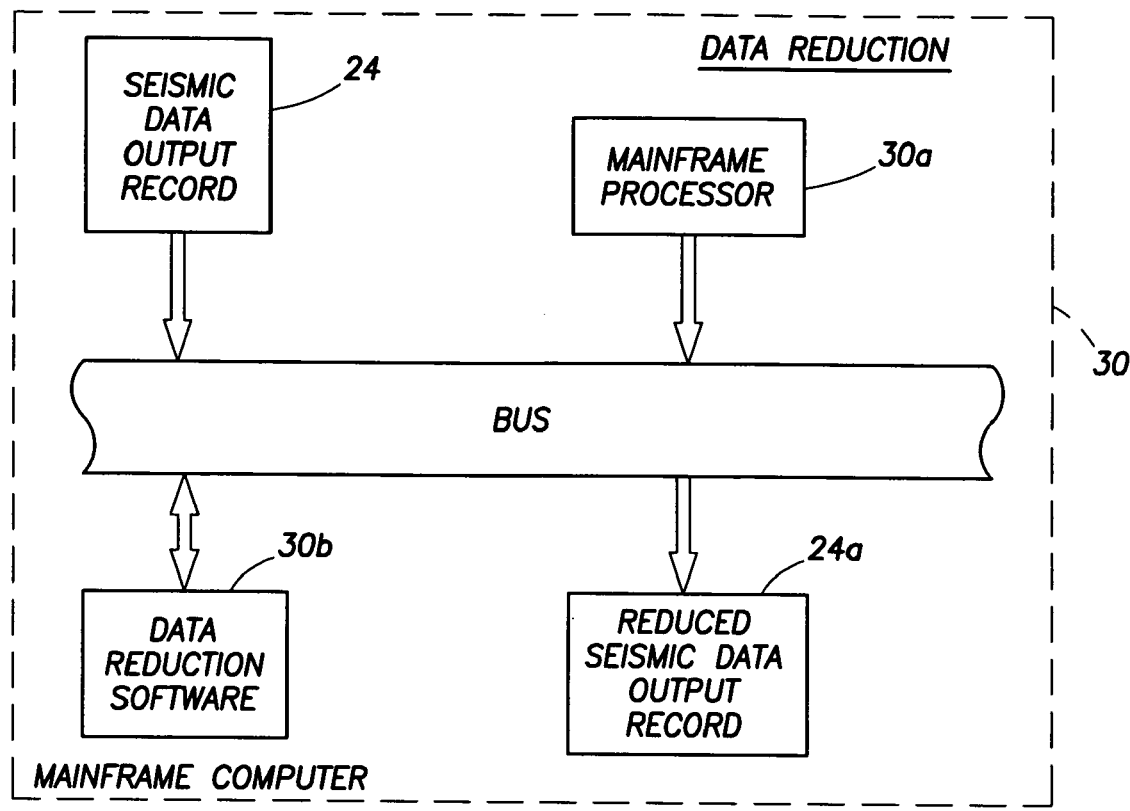
FIG. 3 illustrates a computer system for performing the data reduction operation of FIG. 1.

Oil and gas is produced from underground rock formations. These rocks are porous, just like a sponge, and they are filled with fluid, usually water. This porous characteristic of rocks is known as porosity. These rocks in addition to being porous have the ability to allow fluids to flow through the pores, a characteristic measured by a property called permeability. When oil (or gas) is trapped in such formations, it may be possible to extract it by drilling wells that tap into the formation. As long as the pressure in the well is lower than that in the rock formation, the fluids contained in the pores will flow into the well. These fluids may then flow naturally up the well to the surface, or the flow up the well may have to be assisted by pumps. The relative amounts of oil, gas and water that are produced at the surface will depend on the fraction of the rock pore space that is occupied by each type of fluid. Water is always present in the pores, but it will not flow unless its volume fraction exceeds a threshold value that varies from one type of rock to another. Similarly, oil and gas will only flow as long as their volume fractions exceed their own thresholds.

The characteristics of the rock (including porosity and permeability) in an oil reservoir vary greatly from one location to another. As a result, the relative amounts of oil, gas and water that can be produced will also vary from reservoir to reservoir. These variations make it difficult to simply predict the amount of fluids and gases a reservoir will produce and the amount of resources it will require to produce from a particular reservoir. However, the parties interested in producing from a reservoir need to project the production of the reservoir with some accuracy in order to determine the feasibility of producing from that reservoir. Therefore, in order to accurately forecast production rates from all of the wells in a reservoir, it is necessary to build a detailed mathematical model of the reservoir's geology and geometry.

A large amount of research has been focused on the development of reservoir simulation tools. These tools include mathematical and computer models that describe and which are used to predict, the multiphase flow of oil and gas within a three dimensional underground formation (a "field"). Reservoir tools use empirically acquired data to describe a field. These data are combined with and manipulated by mathematical models whose output describes specified characteristics of the field at a future time and in terms of measurable quantities such as the production or injection rates of individual wells and groups of wells, the bottom hole or tubing head pressure at each well, and the distribution of pressure and fluid phases within the reservoir.

The mathematical model of a reservoir is typically done by dividing the reservoir volume into a large number of interconnected cells and estimating the average permeability, porosity and other rock properties for each cell. This process makes use of seismic data, well logs, and rock cores recovered when wells are drilled. Production from the reservoir can then be mathematically modeled by numerically solving a system of three or more nonlinear, partial differential equations describing fluid flow in the reservoir.

Computer analysis of production from an oil reservoir is usually divided into two phases, history matching and prediction. In the history matching phase, the past production behavior of the reservoir and its wells is repeatedly modeled, beginning with initial production and continuing up to the present time. The first computer run is based on a geological model as described above. After each run, the computer results are compared in detail with data gathered in the oil field during the entire period of production. Geoscientists modify the geological model of the reservoir on the basis of the differences between computed and actual production performance and rerun the computer model. This process continues until the mathematical reservoir model behaves like the real oil reservoir.

Once a suitable history match has been obtained, production from the oil reservoir can be predicted far into the future (sometimes for as long as 50 years). Oil recovery can be maximized and production costs minimized by comparing many alternative operating plans, each requiring a new run of the computer model. After a field development plan is put into action, the reservoir model may be periodically rerun and further tuned to improve its ability to match newly gathered production data.

When sufficient data is obtained about the reservoir, characteristics of a reservoir can be mathematically modeled to predict production rates from wells in that reservoir. The gross characteristics of the field include the porosity and permeability of the reservoir rocks, the thickness of the geological zones, the location and characteristics of geological faults, relative permeability and capillary pressure functions and such characteristics of the reservoir fluids as density, viscosity and phase equilibrium relationships. From this data, a set of continuous partial differential equations (PDEs) are generated that describe the behavior of the field as a function of time and production parameters. These production parameters include the locations of wells, the characteristics of the well's completions, and the operating constraints applied to the wells. Operating constraints may include such as the production rate of a particular fluid phase, the bottom hole pressure, the tubing head pressure, or the combined flow rates of a group of wells. These constraints may be applied directly by data or by means of another simulator that models the flow of fluids in the surface equipment used to transport the fluids produced from or injected into the wells. However, because only the simplest system of PDEs can be solved using classic or closed-form techniques (e.g., a homogeneous field having circular boundaries), a model's PDEs are converted into a set of non-linear approximations which are then solved numerically. One approximation technique is the finite difference method. In the finite difference method, reservoir PDEs are converted into a series of difference quotients which divide a reservoir into a collection of discrete three dimensional cells, which are then solved for at discrete times to determine (or predict) the value of reservoir characteristics such as pressure, permeability, fluid fractions, and at a later time.

Within the computerized 'reservoir simulator', reservoir performance is modeled in discrete increments of time. Each so-called timestep advances the solution from a previous point in time, where all variables are known, to a future point in time, where all variables are unknown. This process is repeated until the entire time period of interest has been modeled. Within each timestep, it is necessary to solve a huge system of nonlinear equations that models fluid flow from cell to cell and through the wells. (With current technology it is possible to include several million cells in the reservoir model.) Solutions to the system of nonlinear equations are obtained by Newton iteration. In each such iteration, the system of nonlinear equations is approximated by a system of linear equations, which must be solved by yet another iterative procedure. One such 'reservoir simulator' is the "Eclipse" reservoir simulator that is owned and operated by Schlumberger Technology Corporation of Houston, Tex.

The "Eclipse" simulator software receives output data from the "Flogrid" simulation gridding software and, responsive thereto, the "Eclipse" simulator software generates a set of simulation results which are displayed on a 3D viewer. The "Flogrid" simulation gridding software is described in U.S. Pat. No. 6,106,561 to Farmer, the disclosure of which is incorporated by reference into this specification.

Figure 10:
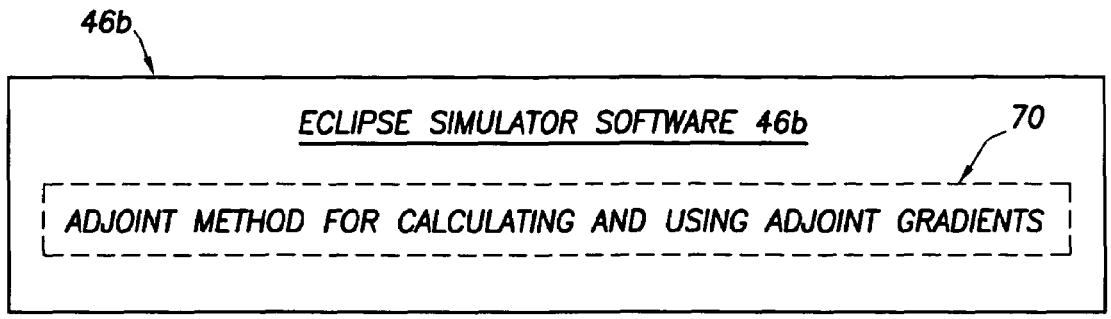
FIG. 10 illustrates the Eclipse simulator software of FIGS. 5 and 6 which includes the 'Adjoint Method of Calculating Gradients' as described in this specification.

As illustrated in FIG. 10, the "Eclipse" simulator software includes an 'Adjoint Method' (including its associated system and program storage device) 'for calculating adjoint gradients of an objective function with respect to changes in valve settings taking into account the modeling of pressure drop and fluid flow along a wellbore, and using the adjoint gradients to calculate sensitivities of a reservoir to changes in parameterization of downhole devices and the use of these sensitivities in optimal control of the wells to optimize some objection function subject to production constraints' (hereinafter called an 'Adjoint method for calculating and using adjoint gradients').

This specification includes: (1) a Background discussion with reference to FIGS. 1-9 which provides background information relating to the performance of a seismic operation and a well logging operation adapted for generating seismic and well logging data, the seismic and well logging data being provided as input data to a workstation that stores a "Flogrid" simulation gridding software and an "Eclipse" simulator software, and (2) a description of the "Eclipse" simulator software further including the 'Adjoint method for calculating and using adjoint gradients' (and associated system and program storage device) discussed below with reference to FIGS. 10-23 representing one possible implementation of the 'Adjoint method for calculating and using adjoint gradients'.

Referring to FIG. 1, a method and apparatus for performing a seismic operation is illustrated. During a seismic operation, a source of acoustic energy or sound vibrations 10, such as an explosive energy source 10, produces a plurality of sound vibrations. In FIG. 1, one such sound vibration 12 reflects off a plurality of horizons 14 in an earth formation 16. The sound vibration(s) 12 is (are) received in a plurality of geophone-receivers 18 situated on the earth's surface, and the geophones 18 produce electrical output signals, referred to as "data received" 20 in FIG. 1, in response to the received sound vibration(s) 12 representative of different parameters (such as amplitude and/or frequency) of the sound vibration(s) 12. The "data received" 20 is provided as "input data" to a computer 22a of a recording truck 22, and, responsive to the "input data", the recording truck computer 22a generates a "seismic data output record" 24. Later in the processing of the seismic data output record 24, such seismic data undergoes "data reduction" 30 in a mainframe computer, and a "reduced seismic data output record" 24a is generated from that data reduction operation 30.

Referring to FIG. 2, a well logging operation is illustrated. During the well logging operation, a well logging tool 34 is lowered into the earth formation 16 of FIG. 1 which is penetrated by a borehole 36. In response to the well logging operation, well log data 38 is generated from the well logging tool 34, the well log data 38 being provided as "input data" to a computer 40a of a well logging truck 40. Responsive to the well log data 38, the well logging truck computer 40a produces a "well log output record" 42.

Referring to FIG. 3, the seismic data output record 24 of FIG. 1 is provided as "input data" to a mainframe computer 30 where the data reduction operation 30 of FIG. 1 is performed. A mainframe processor 30a will execute a data reduction software 30b stored in a mainframe storage 30b. When the execution of the data reduction software 30b is complete, the reduced seismic data output record 24a of FIGS. 1 and 3 is generated.

Figure 4:
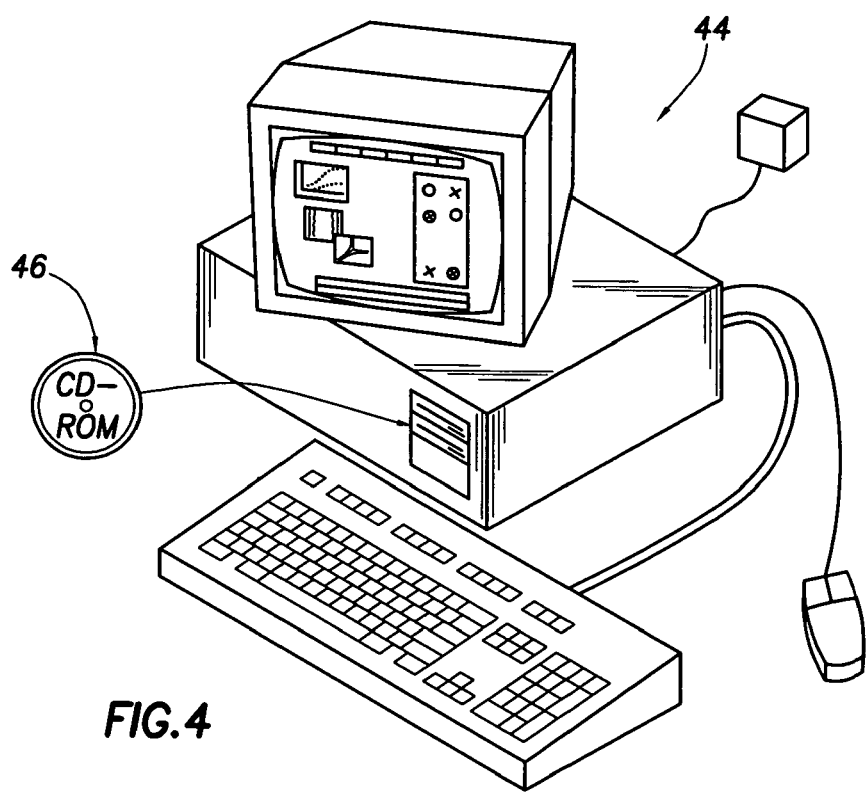
FIGS. 4 and 5 illustrate a workstation adapted for storing a "Flogrid" software and an "Eclipse" simulator software.
Figure 5:
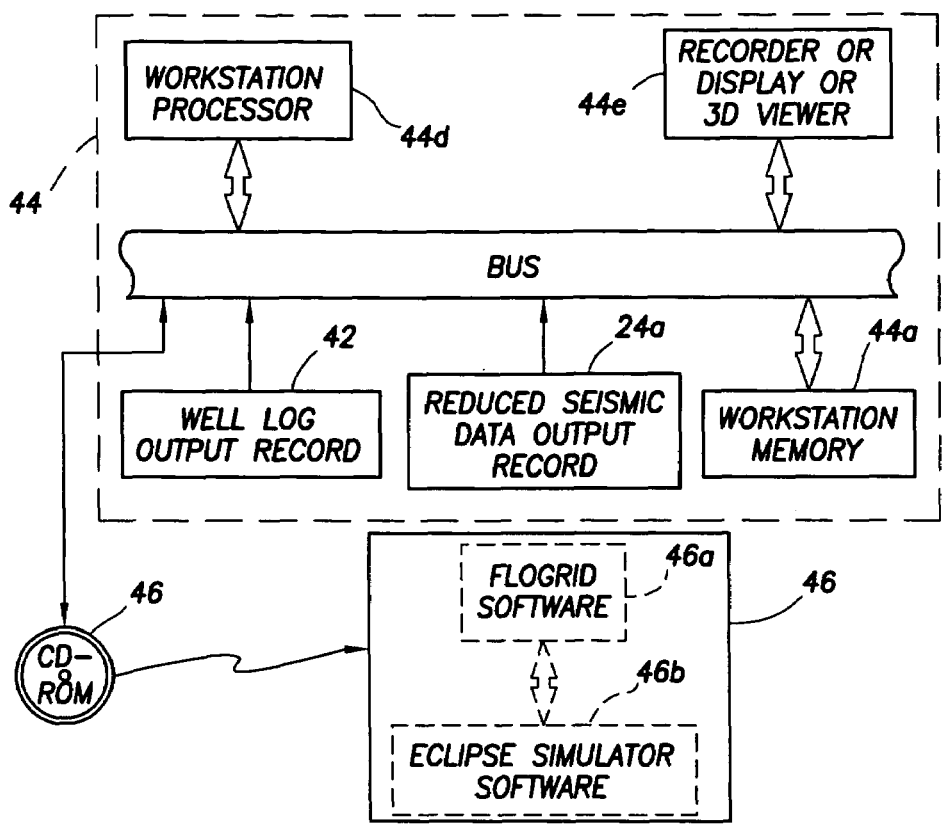

Referring to FIGS. 4 and 5, a workstation 44 is illustrated in FIG. 4. A storage medium 46, such as a CD-Rom 46, stores software, and that software can be loaded into the workstation 44 for storage in the memory of the workstation. In FIG. 5, the workstation 44 includes a workstation memory 44a, the software stored on the storage medium (CD-Rom) 46 being loaded into the workstation 44 and stored in the workstation memory 44a. A workstation processor 44d will execute the software stored in the workstation memory 44a in response to certain input data provided to the workstation processor 44d, and then the processor 44d will display or record the results of that processing on the workstation "recorder or display or 3D viewer" 44e. The input data, that is provided to the workstation 44 in FIG. 5, includes the well log output record 42 and the reduced seismic data output record 24a. The "well log output record" 42 represents the well log data generated during the well logging operation in an earth formation of FIG. 2, and the "reduced seismic data output record" 24a represents data-reduced seismic data generated by the mainframe computer 30 in FIG. 3 in response to the seismic operation illustrated in FIG. 1. In FIG. 5, the software stored on the storage medium (CD-Rom) 46 in FIG. 5 includes a "Flogrid" software 46a and an "Eclipse" simulator software 46b. When the storage medium (CD-Rom) 46 is inserted into the workstation 44 of FIG. 5, the "Flogrid" software 46a and the "Eclipse" simulator software 46b, stored on the CD-Rom 46, are both loaded into the workstation 44 and stored in the workstation memory 44a. The "Flogrid" software 46a and the "Eclipse" simulator software 46b are owned and operated by Schlumberger Technology Corporation of Houston, Tex. The "Flogrid" software 46a is disclosed in U.S. Pat. No. 6,106,561 to Farmer entitled 'Simulation Gridding Method and Apparatus including a Structured Areal Gridder Adapted for use by a Reservoir Simulator', the disclosure of which is incorporated by reference into this specification. When the workstation processor 44d executes the Flogrid software 46a and the Eclipse simulator software 46b, the "Eclipse" simulator software 46b responds to a set of more accurate grid cell property information associated with a respective set of grid blocks of a structured simulation grid generated by the "Flogrid" software 46a by further generating a set of more accurate simulation results which are associated, respectively, with the set of grid blocks of the simulation grid. Those simulation results are displayed on the 3D viewer 44e of FIG. 5 and can be recorded on a recorder 44e.

Figure 6:
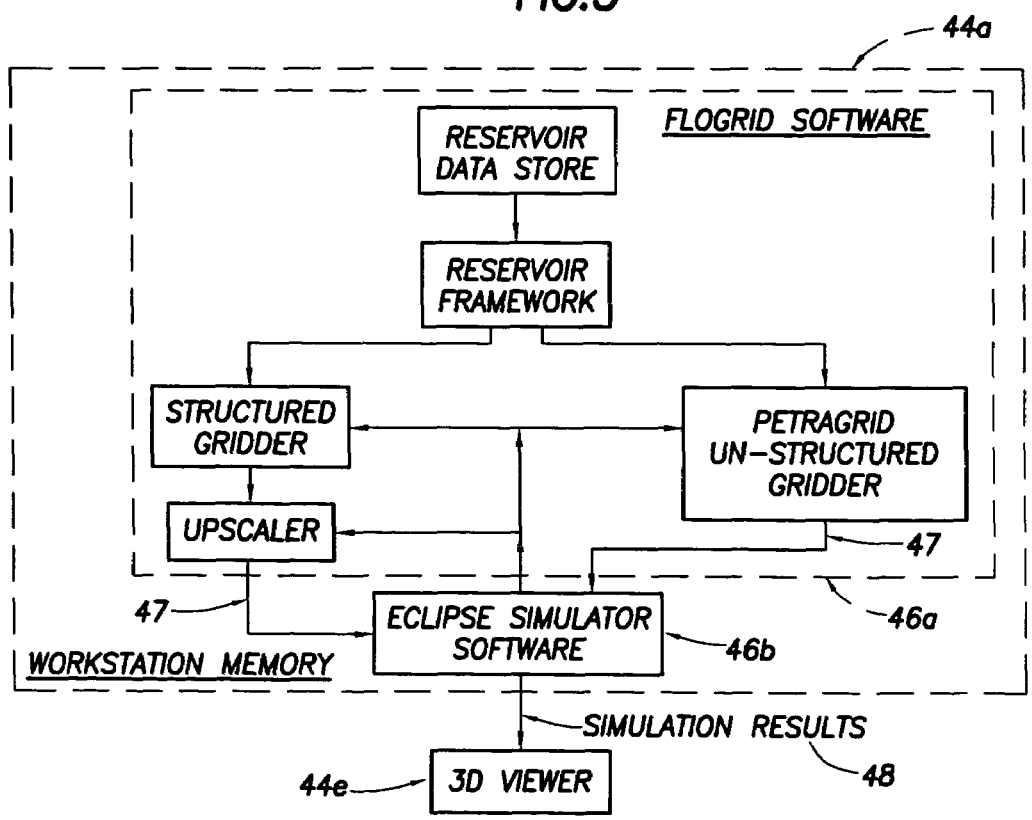
FIGS. 6 and 7 illustrate a more detailed construction of the "Flogrid" software of FIG. 5 which is adapted for generating output data for use by the "Eclipse" simulator software, the Eclipse simulator software including a "Finite Volume Method for Linear Elasticity Equations" which is described in this specification.
Figure 7:
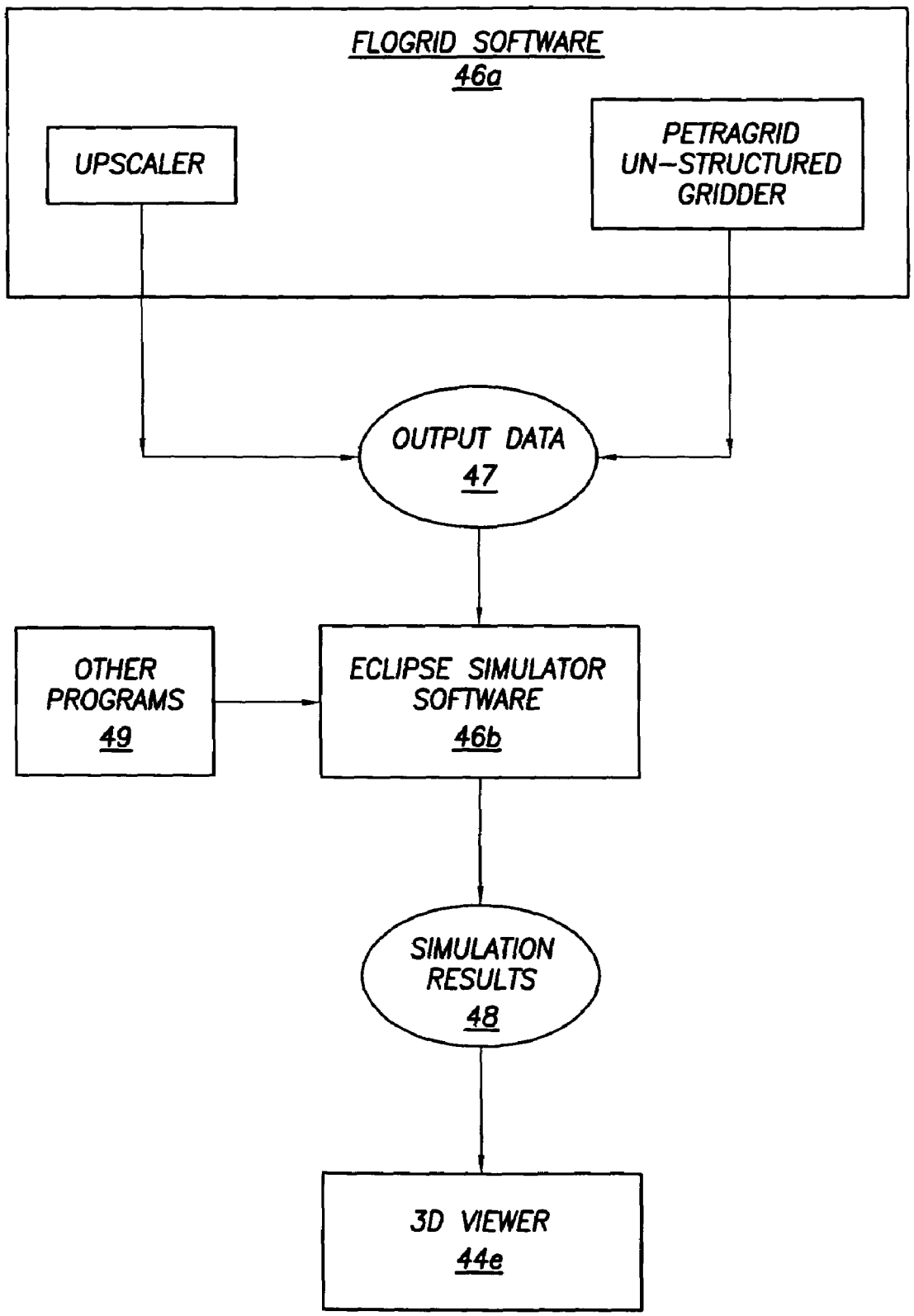

Referring to FIGS. 6 and 7, referring initially to FIG. 6, the Flogrid software 46a and the Eclipse simulator software 46b are illustrated as being stored in the workstation memory 44a of FIG. 5. In addition, the "simulation results" 48, which are output from the Eclipse simulator software 46b, are illustrated as being received by and displayed on the 3D viewer 44e. The Flogrid software 46a includes a reservoir data store, a reservoir framework, a structured gridder, an unstructured gridder, and an upscaler, all of which are fully discussed in the above referenced U.S. Pat. No. 6,106,561 to Farmer, the disclosure of which has already been incorporated by reference into this specification. In FIG. 6, a set of "simulation grids and properties associated with the grids" 47, generated by the Upscaler and the "Petragrid" unstructured gridder, are received by the Eclipse simulator software 46b. In response, the Eclipse simulator software 46b generates a "set of simulation results associated, respectively, with a set of grid blocks of the simulation grids" 48, and the simulation results and the associated grid blocks 48 are displayed on the 3D viewer 44e. The "Petragrid" unstructured gridder is disclosed in U.S. Pat. Nos. 6,018,497 and 6,078,869, the disclosures of which are incorporated by reference into this specification.

In FIG. 7, the Flogrid software 46a generates a set of output data 47 comprising a plurality of grid cells and certain properties associated with those grid cells. That output data 47 is provided as input data to the Eclipse simulator software 46b. Some other programs 49 provide other input data to the Eclipse simulator software 46b. In response to the output data 47 (comprised of a gridded earth formation including a plurality of grid cells and certain properties associated with each of the grid cells), as well as the other output data from the other programs 49, the Eclipse simulator software 46b generates a set of "simulation results" 48, the simulation results 48 including the plurality of grid cells and a plurality of simulation results associated, respectively, with the plurality of grid cells. The aforementioned plurality of grid cells and the plurality of simulation results associated, respectively, with the plurality of grid cells are displayed on the 3D Viewer 44e of FIGS. 6 and 7.

Figure 8:
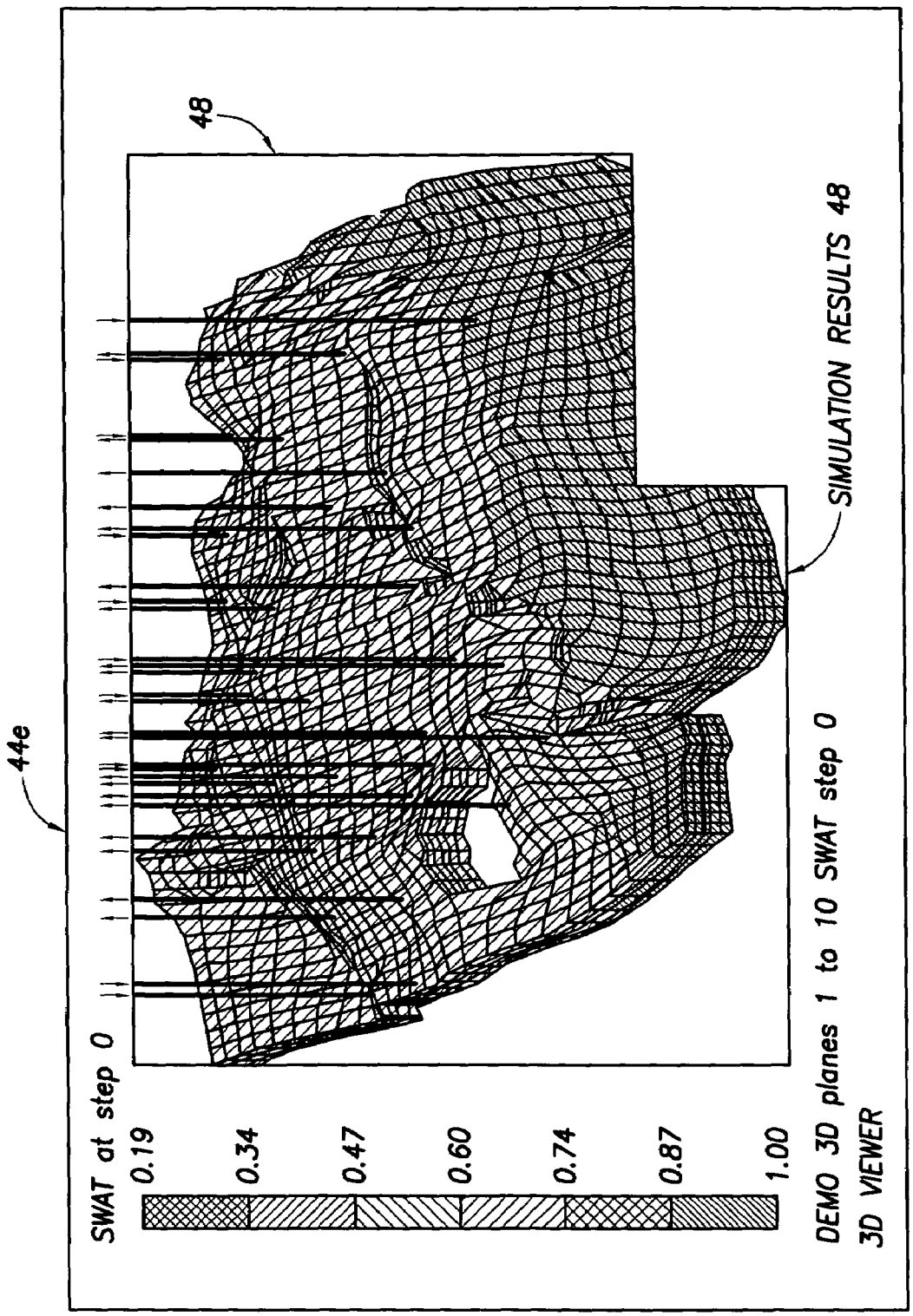
FIG. 8 illustrates an example of a typical output display generated by the "Eclipse" simulator software of FIG. 6 which is displayed on the 3D viewer of FIG. 6.

Referring to FIG. 8, an example of the simulation results 48 (i.e., the "plurality of grid cells and the plurality of simulation results associated, respectively, with the plurality of grid cells" 48) which are displayed on the 3D viewer 44e of FIGS. 5 and 6 and 7, is illustrated in FIG. 8.

The following paragraphs will present the Eclipse Simulator Software 46b of FIGS. 5, 6, and 7, where the Eclipse Simulator Software 46b further includes a Detailed Description of an 'Adjoint method for calculating and using adjoint gradients' (and associated System and Program Storage Device) as shown in FIG. 10. In particular, the following paragraphs will present a Detailed Description of an 'Adjoint Method' (including its associated system and program storage device) 'for calculating adjoint gradients of an objective function with respect to changes in valve settings taking into account the modeling of pressure drop and fluid flow along a wellbore, and using the adjoint gradients to calculate sensitivities of a reservoir to changes in parameterization of downhole devices and the use of these sensitivities in optimal control of the wells to optimize some objection function subject to production constraints', as shown in FIG. 11.

Figure 9:
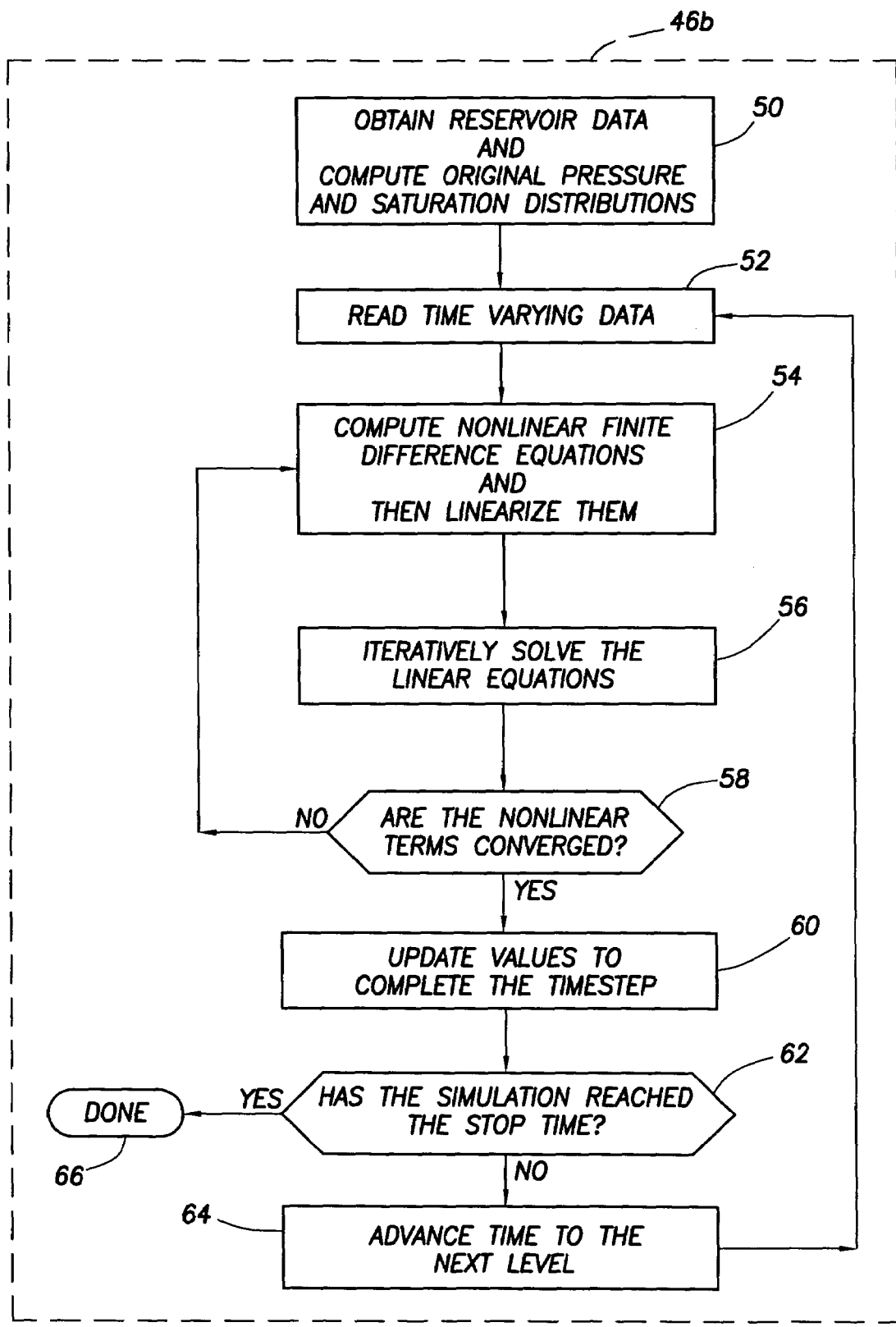
FIG. 9 illustrates a prior art approach or method of performing reservoir simulation which has been practiced by prior art reservoir simulators.

Referring to FIG. 9, a general outline of the operation of a prior art reservoir simulator is discussed below with reference to FIG. 9. In FIG. 9, reservoir data 42 and 24a of FIG. 5 and rock core data are used to describe a computational grid and the properties of the reservoir rocks. This data is combined with data relating to the physical properties of the fluids contained in the reservoir, the combined data being used to compute the initial distributions of pressure and fluid saturations (volume fractions) as well as the composition of each fluid phase, block 50 in FIG. 9. Time varying data, such as the locations and characteristics of wells, production and injection flow rate controls, and simulator control information is read from a data base, block 52. Using the current pressure, saturation, and fluid compositions for each grid cell, the partial differential equations describing mass balances are approximated by finite differences in block 54 which results in two or more nonlinear algebraic equations for each grid cell. Also, in block 54, these nonlinear equations are linearized by means of Newton's method. In block 56, the resulting system of linear equations is solved iteratively, using methods described in this specification. After the linear equations have been solved, there is a test in block 58 to determine whether all of the nonlinear terms in the finite difference equations have converged. If not, the simulator returns to block 54. If the nonlinear terms in the finite difference equations have converged, the simulator moves to block 60 and updates values to complete the current timestep. In block 62, the simulator tests to determine whether the desired ending time (i.e., the stop time) in the simulation has been reached. If not, the simulator advances time to the next level, block 64, and then it returns to block 52 to read new time varying data and to begin the next timestep. If the endpoint of the simulation has been reached, then, the simulator completes output operations and the run is finished, block 66.

Figure 11:
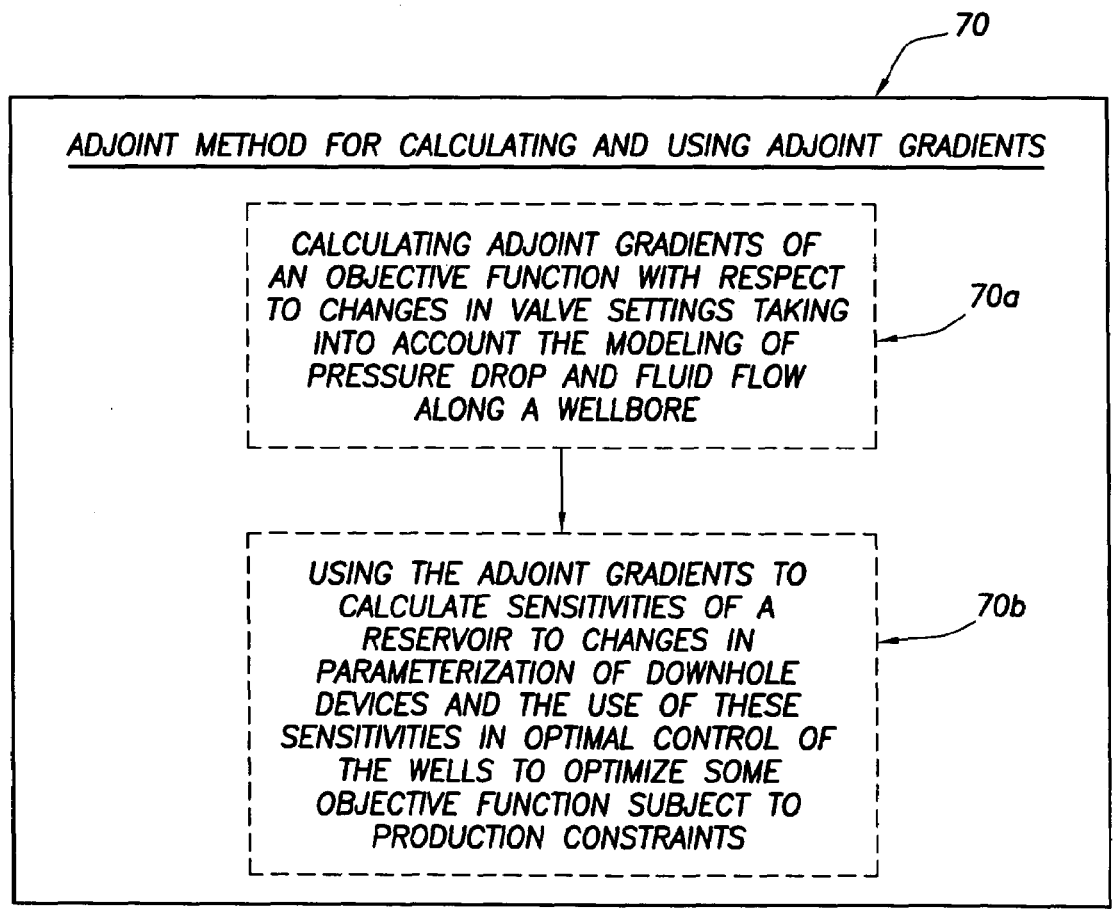
FIG. 11 illustrates, in more detail, the 'Adjoint Method of Calculating Gradients' of FIG. 10.

Refer now to FIGS. 10 and 11.

In FIG. 10, the Eclipse simulator software 46b of FIGS. 5 and 6 and 7 includes software which functions to perform or practice an 'Adjoint Method for Calculating and Using Adjoint Gradients', step 70 in FIG. 10.

In FIG. 11, however, the 'Adjoint Method' (including its associated system and program storage device) 'for Calculating and Using Adjoint Gradients' step 70 in FIG. 10 includes two basic steps (steps 70a and 70b) which are discussed below with reference to FIG. 11, as follows:

(Step 1) 'Calculating adjoint gradients of an objective function with respect to changes in valve settings taking into account the modeling of pressure drop and fluid flow along a wellbore', step 70a in FIG. 11; and (Step 2) 'Using the adjoint gradients to calculate sensitivities of a reservoir to changes in parameterization of downhole devices and the use of these sensitivities in optimal control of the wells to optimize some objective function subject to production constraints', step 70b in FIG. 11.

Each of the above referenced two steps 70a and 70b illustrated in FIG. 11 associated with the 'Adjoint Method for Calculating and Using Adjoint Gradients' step 70 in FIG. 10 will be discussed in detail below with reference to FIGS. 12 through 23 of the drawings.

In FIGS. 10 and 11, the 'Adjoint Method' (and associated system and program storage device) 'for Calculating and for Using Adjoint Gradients' illustrated in FIGS. 10 and 11 effectively and efficiently optimizes settings of control valves in a reservoir and, as a result, optimizes the production of oil, gas, and other hydrocarbons from the reservoir. The 'Adjoint method' (and associated system and program storage device) 'for calculating and using adjoint gradients' shown in FIGS. 10 and 11 represents a 'proactive deterministic constrained optimization method'. 'Gradients' are required for this 'proactive deterministic constrained optimization method'. The term 'gradients': means 'the sensitivity or response of the reservoir to a change in a control parameter', and represents 'quantitative information on how an objective will respond to any changes made in the well operating targets and valve settings'. Given that control of the behavior of a large number of wells in a reservoir at a reasonably high frequency may be desired, the 'gradients' are required for a large number of control parameters (on the order of $10^5$ to $10^7$). Hence, the 'adjoint method for calculating and using adjoint gradients' shown in FIG. 10 must generate and provide these 'gradients' efficiently and accurately. For this reason, the aforesaid 'adjoint method for calculating and using adjoint gradients' of FIG. 10 represents a function that is practiced by in a reservoir simulator, such as the 'Eclipse' reservoir simulator that is owned and operated by Schlumberger Technology Corporation.

Another 'adjoint method' has previously been applied to optimization within reservoir simulation by 'several authors'. However, the studies produced by the aforesaid 'several authors' include smart wells as a series of independent injectors or producers, and, as such, do not take into account the accurate modelling of the pressure drop along the wellbore. In addition, the 'several authors' have published the 'use of the adjoint method to calculate gradients in reservoir simulation', such as: (1) Fifth European Conference on Mathematics of Oil Recovery (Zakirov, Zakirov, Aanonsen, Palatnik), (2) SPE 78278 (Brouwer, Jansen), and (3) SPE 92864 (Sarma, Aziz, Durlofsky).

In addition, the use of a multi-segmented well model in reservoir simulation to accurately model flow in a wellbore is disclosed in prior pending U.S. application Ser. No. 10/900,176 to David A. Edwards et al, entitled "Near Wellbore Modeling method and apparatus" published as US patent application number 20050015231 published Jan. 20, 2005.

However, the 'adjoint method for calculating and using adjoint gradients' disclosed in FIGS. 10 and 11 of this specification may include use of a fully coupled multi-segmented well model that accurately calculates the pressure drop and component flow rates along the length of a multi-lateral well. In addition, the 'adjoint method for calculating and using adjoint gradients' of FIGS. 10 and 11 addresses the problem of 'how to control downhole devices' to achieve an objective, where the objective includes maximizing hydrocarbon recovery or the net present value of the reservoir. The aforesaid problem (of 'how to control downhole devices') involves the control of fluid fronts in a reservoir in order to prolong hydrocarbon production from the reservoir field as a whole while minimizing the production of unwanted fluids. In addition, control parameters associated with the aforesaid problem (of 'how to control downhole devices') include: (1) well production and injection rates and pressures, and (2) the settings of down-hole inflow control devices.

The accurate modeling of the physics of fluid flow within smart wells is of paramount importance when developing control strategies for this type of well. The control of downhole devices is modeled by using a reservoir simulator adapted for accurately modeling the physics of fluid flow in smart wells, such as the previously referenced 'Eclipse' reservoir simulator owned and operated by Schlumberger Technology Corporation. As a result, a 'gradient-based field optimization method' is disclosed in this specification, the aforementioned 'gradient-based field optimization method' being known as the 'Adjoint method for calculating and using adjoint gradients' illustrated in FIGS. 10 and 11. The aforesaid 'gradients' are calculated using the 'Adjoint method for calculating and using adjoint gradients' of FIGS. 10 and 11. The 'Adjoint method for calculating and using adjoint gradients' of FIGS. 10 and 11 is used because it provides a very efficient 'method of calculating gradients of the objective function' for a large numbers of parameters. This is of great significance in reservoir simulation where there may be a large number of controllable wells in the reservoir and a large number of valves in the wells that may be changed at regular intervals over the lifetime of the reservoir. The 'Adjoint method for calculating and using adjoint gradients' of FIGS. 10 and 11 accurately calculates the 'gradients of an objective function' with respect to changes in valve settings, taking into account the accurate modeling of pressure drop and fluid flow along the well bore. These gradients are then used to calculate the sensitivities of a reservoir to changes in parameterization of downhole device. These sensitivities are then used in an 'optimal control of the wells in the reservoir' in order to optimize some objective function subject to production constraints. The 'optimal control of the wells in the reservoir' includes the generation of 'new optimized control settings' for wells and/or the generation of 'new optimized control settings' for a set of downhole well valves that are disposed within those wells.

Consequently, the 'Adjoint method for calculating and using adjoint gradients' disclosed in this specification and shown in FIGS. 10 and 11: (1) concerns the first application of adjoint gradients to control and optimize settings in a multi-segmented well model; and, in particular, (2) represents the use of adjoint gradients to calculate sensitivities of a reservoir to changes in parameterization of downhole devices and the use of these sensitivities in optimal control of the wells to optimize some objective function, subject to production constraints, where an example of an objective function would be 'cumulative oil production' (see step 70b in FIG. 11).

Figure 12:
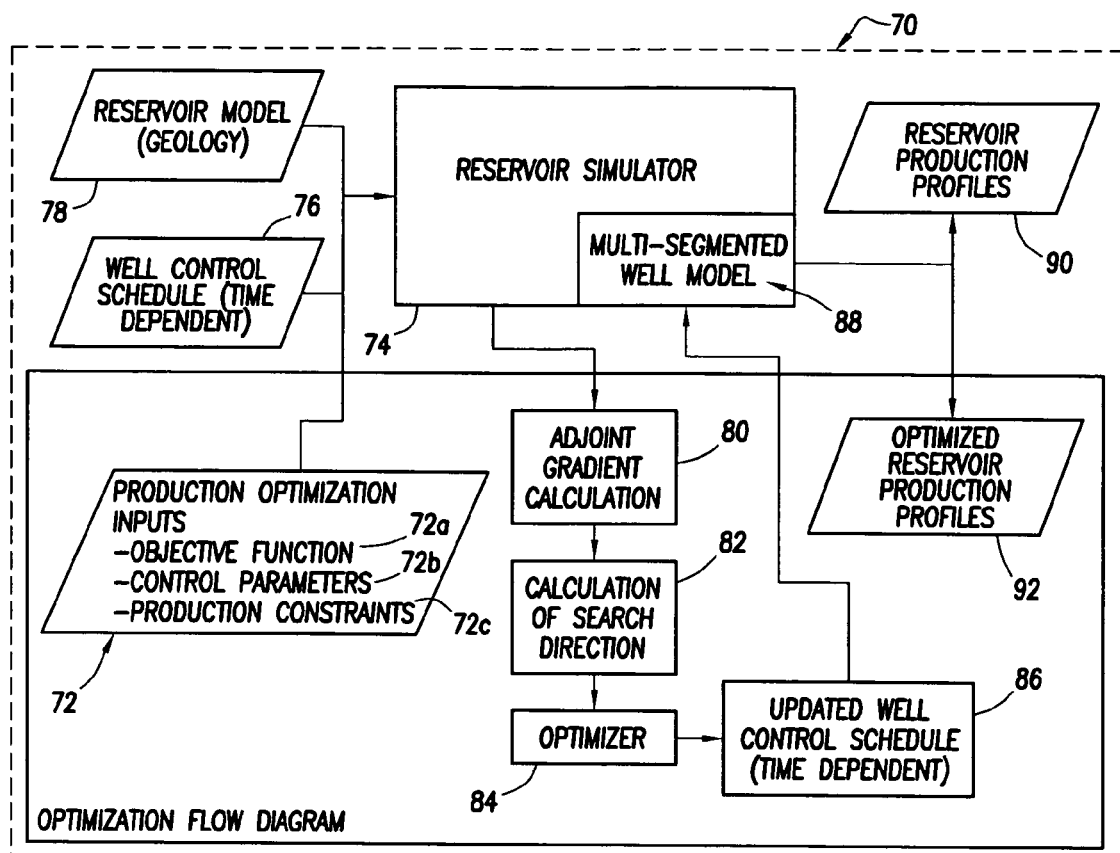
FIG. 12 illustrates a more detailed construction of the 'Adjoint Method of Calculating Gradients' as illustrated in FIGS. 10 and 11.

Referring to FIG. 12, one construction of the 'Adjoint Method for Calculating and Using Adjoint Gradients' 70 of FIGS. 10 and 11 is illustrated, the construction shown in FIG. 12 representing an optimization flow diagram which functions to practice the 'Adjoint Method for Calculating and Using Adjoint Gradients' 70 of FIGS. 10 and 11.

In FIG. 12, a new set of 'Production Optimization Inputs' 72, including an objective function 72a, a set of control parameters 72b, and production constraints 72c, are provided as 'input data' to a 'Reservoir Simulator' 74, such as the aforementioned 'Eclipse' reservoir simulator offered by Schlumberger Information Solutions, a division of Schlumberger Technology Corporation of Houston, Tex. The set of 'Production Optimization Inputs' 72 (which are provided as 'input data' to the Reservoir Simulator 74) are used to define an optimization problem that will be solved by the 'Reservoir Simulator' 74. In addition, a 'Well Control Schedule' 76 (which is time dependent) and a 'Reservoir Model' 78 (providing the geology of the reservoir) are also provided as 'input data' to the 'Reservoir Simulator' 74. The 'Reservoir Simulator' 74 includes a 'multi-segmented well model' 88, the construction and function of which will be described later in this specification. As noted earlier, the set of 'Production Optimization Inputs' 72, including the objective function 72a, the set of control parameters 72b, and the production constraints 72c, are provided as 'input data' to the 'Reservoir Simulator' 74. In FIG. 12, the 'objective function' 72a represents a linear combination of discounted flowing rates, a measure of the value of the reservoir; and the 'control parameters' 72b represent or include well control settings which may be changed during simulation, such as valve settings in an instrumented well, rate settings for conventional and instrumented wells, and bottom hole pressure settings for conventional and instrumented wells. As noted earlier, the 'Reservoir Simulator' 74 includes a 'multi-segmented well model' 88. The 'multi-segmented well model' 88 is a model of a physical well which accurately models the pressure drop and fluid flow along the wellbore; this is achieved by discretizing the well path into segments within which the flow equations are solved consistently. When the 'Reservoir Simulator' 74 receives, as 'input data', the reservoir model 78, the well control schedule 76, and the production optimization inputs 72 including the objective function 72a and the control parameters 72b and the production constraints 72c, the Reservoir Simulator 74 will perform an Adjoint Gradient Calculation 80. As noted in FIG. 12, the 'Adjoint Gradient' associated with the 'Adjoint Gradient Calculation' 80 is a derivative of the above referenced 'objective function' 72a with respect to changes in the control parameters 72b that are evaluated using the adjoint method. A solution to a large adjoint system of linear equations is required at regular time intervals to calculate the adjoint gradients of the objective function 72a with respect to the control parameters 72b. When the Adjoint Gradient Calculation 80 is complete, the following two additional steps will be performed in sequence: (1) Calculation of Search Direction 82; that is, a suggested change to the control parameters 72b that will not violate any production constraints or limit values of the control parameters, followed by (2) an Optimizer 84 which executes an optimization software that maximizes the objective function using line-search methods. Recalling that the 'input data' provided to the 'Reservoir Simulator' 74 included a 'well control schedule' 76, when the function performed by the Optimizer 84 is completed, the Optimizer 84 will then generate an 'Updated Well Control Schedule (which is time dependent)' 86, wherein, when a local maximum has been located along the gradient-based search direction, or when a production constraint is encountered, the Optimizer 84 will generate the 'Updated Well Control Schedule' 86 which is comprised of new updated control parameters. The 'Updated Well Control Schedule' 86 comprised of the new updated control parameters is then presented to the 'multi-segmented well model 88 associated with the Reservoir Simulator 74; and, responsive thereto, the Simulator 74 is rerun using these new updated control parameters. In particular, recalling that the 'Reservoir Simulator' 74 includes a 'multi-segmented well model' 88, the 'multi-segmented well model' 88 will receive the 'Updated Well Control Schedule' 86 from the Optimizer 84, and, responsive thereto, the 'multi-segmented well model' 88 will then generate two 'outputs': (1) Reservoir Production Profiles 90, and (2) Optimized Reservoir Production Profiles 92. As a result, FIG. 12, which illustrates one construction of the 'Adjoint Method for Calculating and Using Adjoint Gradients' 70 of FIGS. 10 and 11, practices a method for optimizing production of a reservoir having one or more wells having valves, the method including: (a) running a reservoir simulator in a forward simulation to simulate the life of the reservoir; (b) processing outputs from the forward simulation to generate intermediate partial derivatives of flow equations for the well and for the reservoir; (c) combining the intermediate partial derivatives of the well flow equations and the reservoir flow equations in the reservoir simulator; (d) solving an adjoint system of linear equations at regular time intervals to calculate a set if adjoint gradients of an objective function with respect to the control parameters; (e) determining from the adjoint gradients a search direction; (f) using the search direction to solve an optimization algorithm that maximizes an objective function using line-search methods; (g) locating a local maximum along the search direction and updating control parameters; (h) using the new updated control parameters in the reservoir simulator; and (i) repeating steps (a)-(i) until an optimal value of the objective function has been reached.

Referring to FIGS. 13 through 23, a detailed description of the construction and the function of the 'multi-segmented well model' 88 of FIG. 12 is illustrated.

Figure 13:
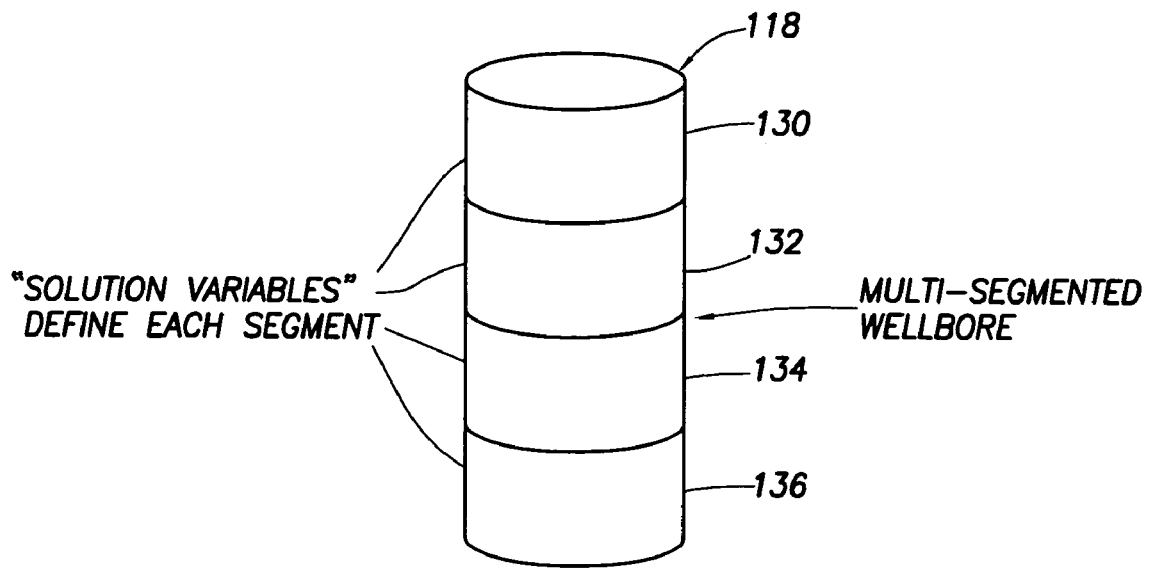
FIGS. 13 through 23 illustrate a detailed construction of the 'Multi-segmented Well Model' which is associated with the 'Adjoint Method of Calculating Gradients' shown in FIG. 12.

In FIG. 13, a wellbore 118 is divided into a plurality of segments and a set of "solution variables" is determined for each of the segments (a method and associated system and program storage device for determining the "solution variables" will be discussed later in this specification). For example, in FIG. 13, a multi-segmented wellbore 118 is illustrated which consists of a plurality of segments, such as segments 130, 132, 134, and 136. As illustrated in FIG. 13, a set of "solution variables" define each segment.

In FIGS. 14 through 23, the process or method for determining the set of "solution variables" for each segment 130, 132, 134, 136 of the multi-segemented wellbore 118 in FIG. 13 is discussed in detail the following paragraphs with reference to FIGS. 14 through 23.

Figure 14:
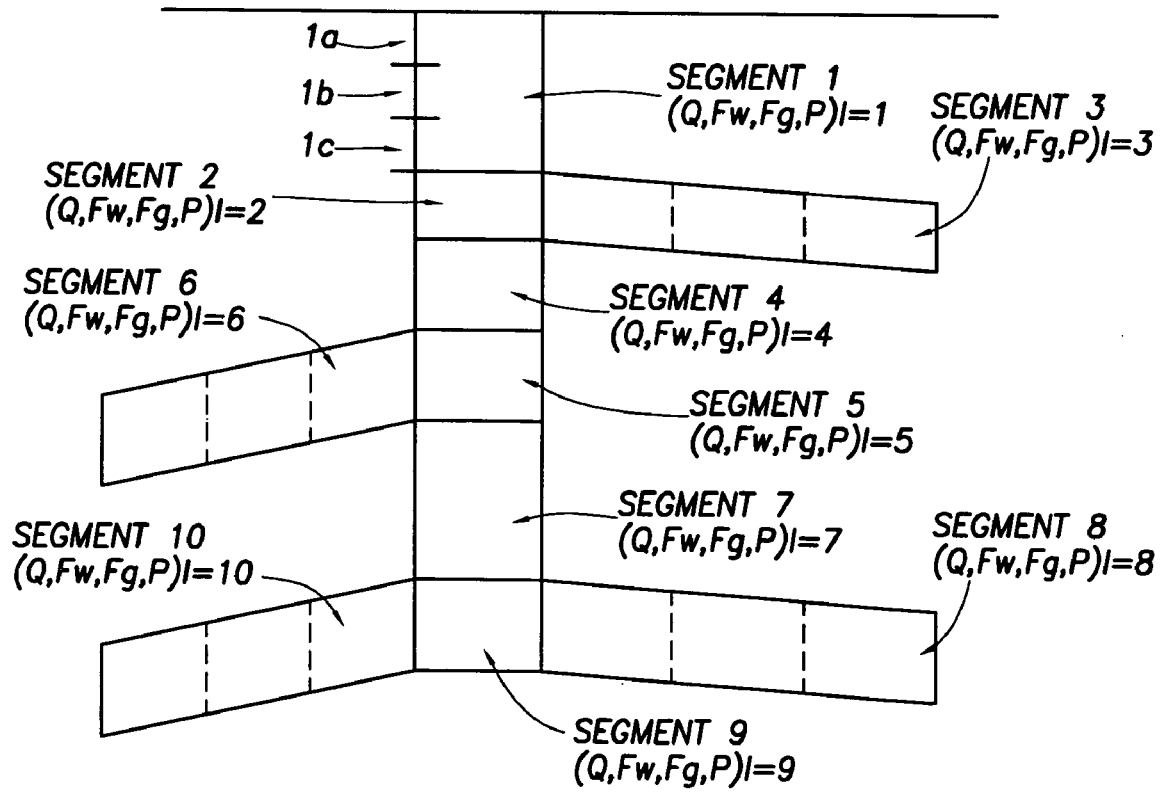

Referring to FIG. 14, a multilateral wellbore is illustrated. In FIG. 14, the multilateral wellbore includes a main stem and four lateral branches; however, the four lateral branches include an upper lateral branch, a middle lateral branch, and two bottom lateral branches. Segments 1, 2, 4, 5, 7, and 9 lie on the main stem. The upper lateral branch of the multilateral wellbore of FIG. 14 includes a plurality of segments, one of those segments being Segment 3. The middle lateral branch of the multilateral wellbore of FIG. 14 also includes a plurality of segments, one of those segments being Segment 6. The two bottom lateral branches of the multilateral wellbore of FIG. 14 each include a plurality of segments. That is, the left-most bottom lateral branch of the multilateral wellbore of FIG. 14 includes a plurality of segments, one of those segments being Segment 10; and the right-most bottom lateral branch of the multilateral wellbore of FIG. 14 includes a plurality of segments, one of those segments being Segment 8. In FIG. 14, each segment can be further divided up into a plurality of sub-segments. For example, Segment 1 can, for example, be divided up into several other sub-segments, such as sub-segments 1a, 1b, and 1c.

In FIG. 14, each "segment" can be characterized and represented by a set of "solution variables". That is, each segment can be characterized or represented by the following set of "solution variables": "Q", the flowrate of fluid in said each segment, "Fw", the fraction of water in that segment, "Fg", the fraction of gas in that segment, and "P", the absolute pressure in that segment. A shorthand notation for each set of "solution variables" for a particular segment is selected to be: "(Q, Fw, Fg, P)i", where "i" identifies the particular segment. Therefore, in FIG. 14, segment 1 of the multilateral wellbore can be characterized or represented by the solution variables "(Q, Fw, Fg, P) i=1", segment 2 of the multilateral wellbore can be characterized or represented by the solution variables "(Q, Fw, Fg, P) i=2", . . . , and segment 10 of the multilateral wellbore can be characterized or represented by the solution variables "(Q, Fw, Fg, P)i=10", etc. See FIG. 14 for a complete list of each set of solution variables "(Q, Fw, Fg, P)i" which characterize and represent each of the segments 1 through 10 of the multilateral wellbore of FIG. 14.

A single bore wellbore has a single pipeline or branch, and that single branch could also be divided up into a plurality of segments, where each segment is characterized or represented by a set of solution variables (Q, Fw, Fg, P)i.

Referring to FIGS. 15 through 23, a more detailed construction of the 'Eclipse' simulator software 46b of FIGS. 6 and 10, where the 'Eclipse' simulator software 46b includes the 'Adjoint method for calculating and using adjoint gradients' 70 of FIG. 10, and where the 'Adjoint method . . .' 70 of FIG. 10 further includes the 'multi-segmented well model' software 88 of FIG. 12, is illustrated.

Figure 15:
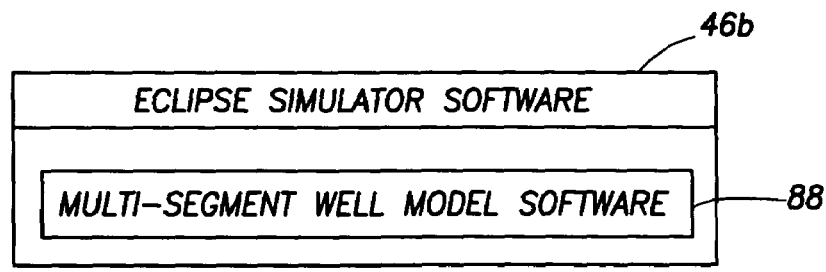
Figure 16:
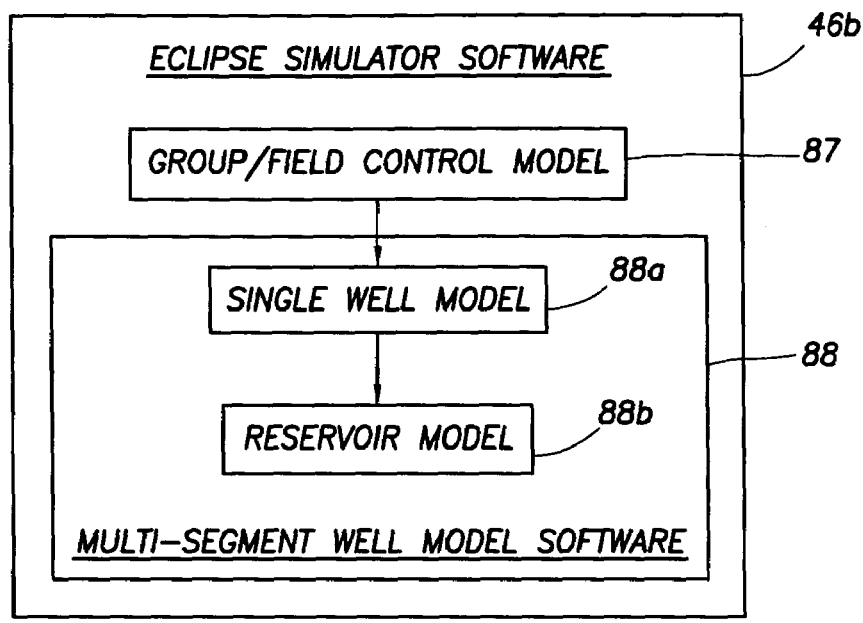

In FIG. 15, the Eclipse simulator software 46b of FIG. 12 includes a multi-segment well model software 88. In FIG. 16, the Eclipse simulator software 46b includes a group/field control model software 87 and the multi-segment well model software 88 which is responsive to the group/field control model software 87. However, in FIG. 16, the multi-segment well model software 88 further includes a single well model software 88a and a reservoir model software 88b which jointly determine the solution variables (Q, Fw, Fg, P) for each segment of a well.

In FIG. 16, the group/field control model software 87 sends targets/limits to the single well model 88a. These targets might be a flow target, such as an oil rate production target, or a pressure target if the group/field control model includes a surface network model (each well has its own target to which the well must produce). The group/field control model 87 must deal with all the collective aspects of production and injection; that is, producing a field to a certain target, allowing for pressure losses for pipelines on the surface, etc.

In response to the targets/limits from the group/field control model 87, the single well model 88a sends well flow rates up to the group/field control model 87. In addition, the single well model 88a sends grid block connection flow rates and derivatives down to the reservoir model 88b. The single well model 88a models each individual well within the reservoir; that is, the single well model operates on a plurality of wells, one at a time.

The reservoir model 88b provides information about fluid conditions in the grid blocks up to the single well model 88a; in addition, the reservoir model 88b provides the increments to the segment solution variables, needed by the single well model 88a, at the end of each iteration, to be discussed below.

In FIG. 16, the single well model 88a interacts with the reservoir model 88b because the reservoir grid blocks act as boundary conditions to the well model single well model. From the reservoir model's point of view, the single well model 88a acts as a source of a set of "source/sink" terms used by the reservoir model. The single well model 88a therefore interacts with the reservoir model 88b and extracts fluid from it, or injects fluid into it, and the Group/Field control model 87 interacts with the single well model 88a in that it decides how to allocate field targets, and gives each single well an operating target.

Figure 17:
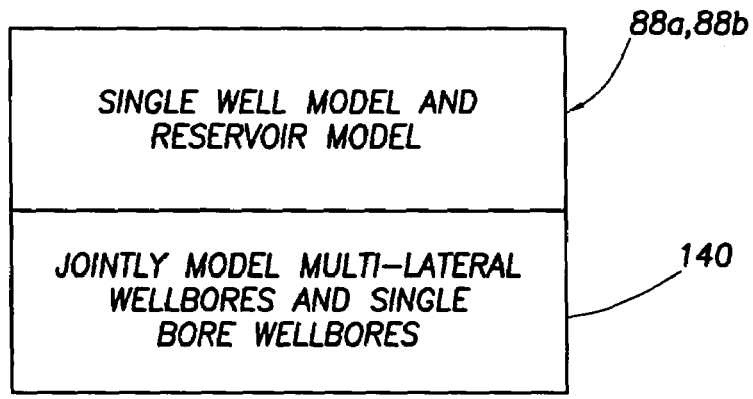
Figure 18:
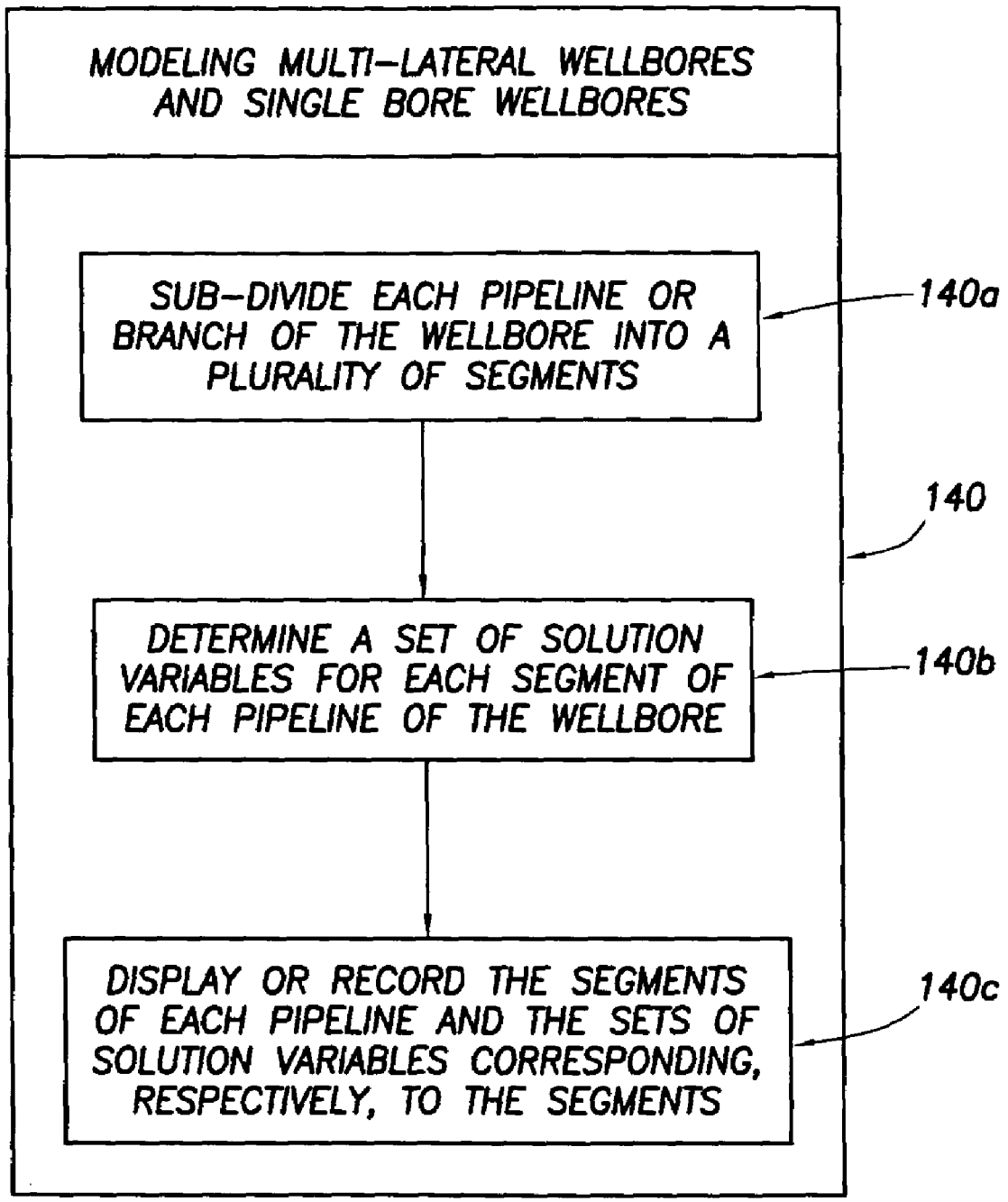

In FIGS. 17 and 18, referring initially to FIG. 17, the single well model software 88a functions to model a multilateral wellbore and a single bore wellbore, block 140 of FIG. 17. In FIG. 18, however, the step of modeling multilateral wellbores and single bore wellbores (block 140 of FIG. 17) comprises the following additional steps: (1) sub-divide each pipeline or branch of the wellbore into a plurality of segments, block 140a, (2) determine a set of solution variables (Q, Fw, Fg, P) for each segment of each pipeline of the wellbore, block 140b, and (3) display and/or record the plurality of segments of each pipeline and plurality of solution variables (Q, Fw, Fg, P) which correspond, respectively, to the plurality of segments, block 140c.

The step of sub-dividing each pipeline or branch of the wellbore into a plurality of segments (block 140a) was discussed briefly above with reference to FIG. 14. However, the step of determining a set of solution variables (Q, Fw, Fg, P) for each segment of each pipeline of the wellbore (block 140b) is practiced by both the single well model 88a and the reservoir model 88b and it will be discussed in detail below with reference to FIGS. 19 through 23.

In FIGS. 19 through 23, a more detailed discussion of block 140b of FIG. 18, which determines a set of solution variables (Q, Fw, Fg, P) for each segment of each pipeline of a multilateral or single bore wellbore, is set forth in the following paragraphs with reference to FIGS. 19 through 23 of the drawings.

Figure 19:
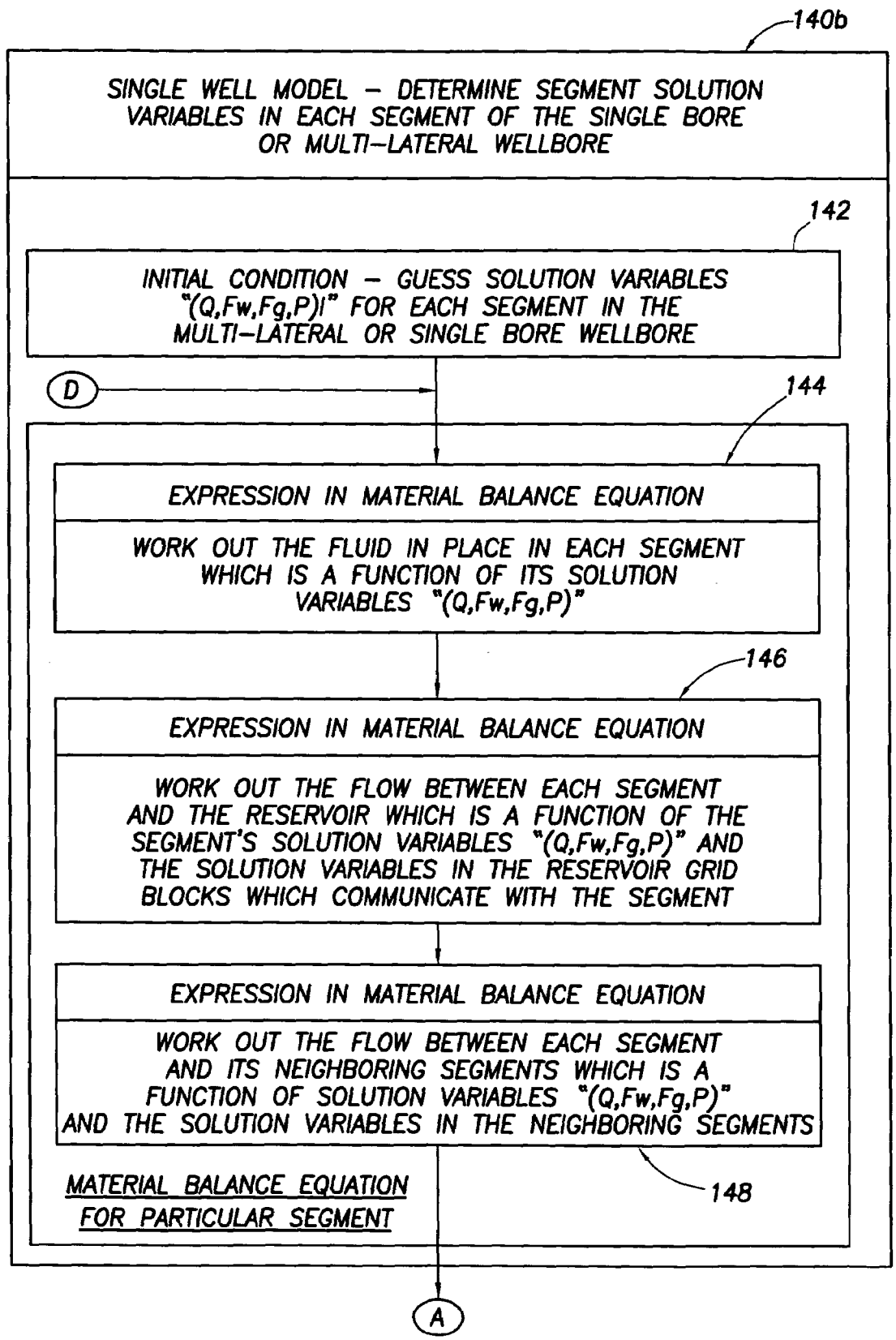

In FIGS. 19, 20, 21, 22, and 23, referring intially to FIG. 19, in order to determine a set of solution variables (Q, Fw, Fg, P) for each segment of each pipeline of the wellbore (block 140b of FIG. 18), the following steps are performed by the single well model software 88a of FIG. 16: (1) initial condition—guess solution variables "(Q, Fw, Fg, P)i" for each segment in the multi-lateral or single bore wellbore, block 142 in FIG.

Figure 20:
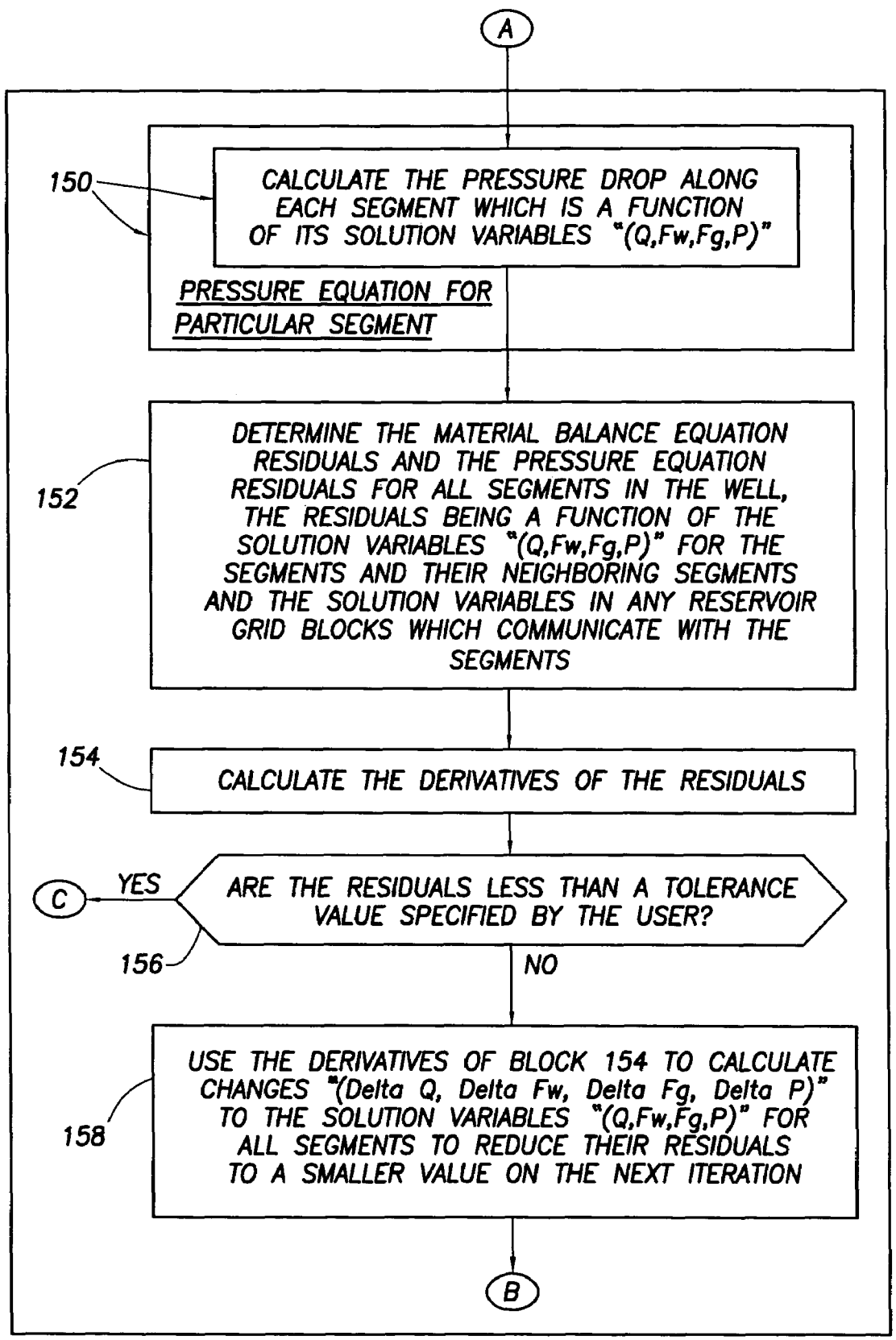
Figure 21:
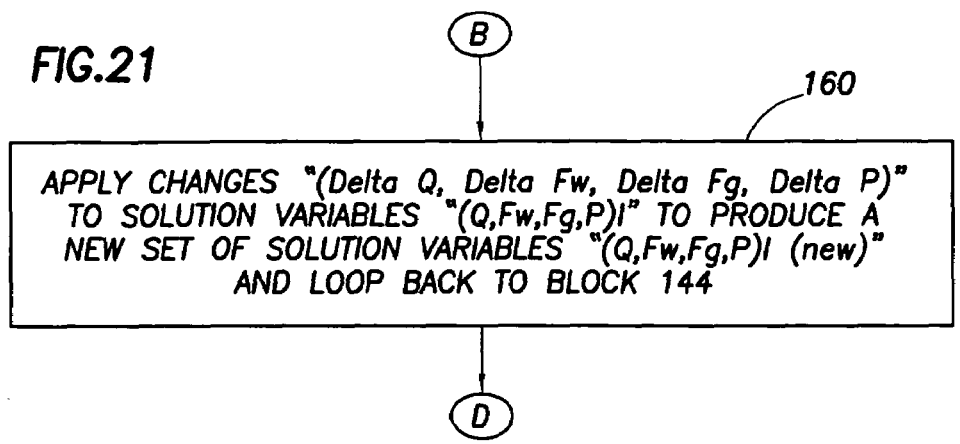
Figure 22:
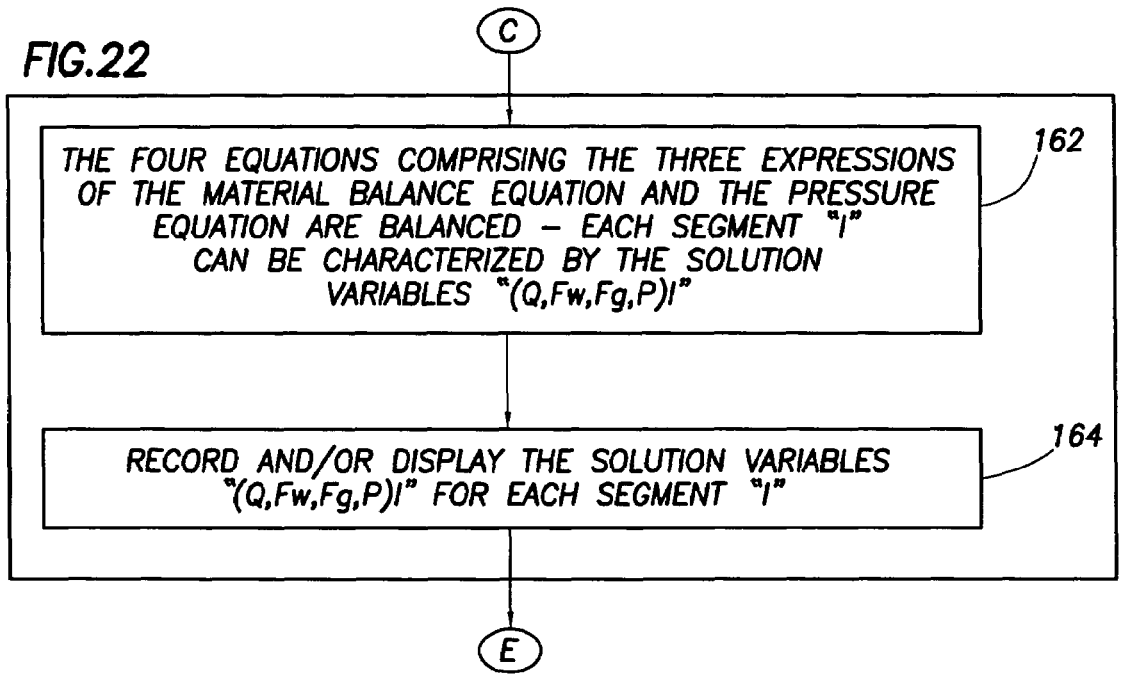
Figure 23:
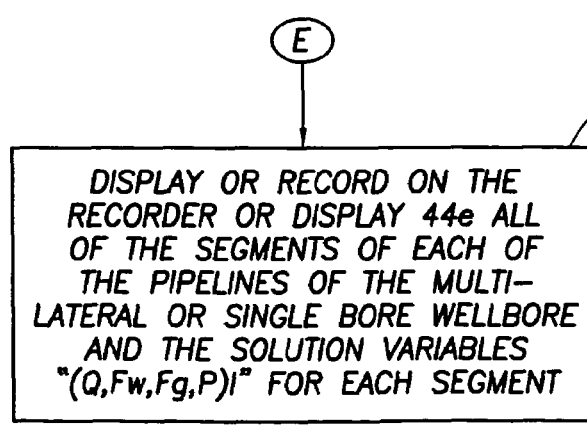

19; (2) work out the fluid in place in each segment which is a function of its solution variables "(Q, Fw, Fg, P)i", block 144 in FIG. 19; (3) work out the flow between each segment and the reservoir which is a function of the segment's solution variables "(Q, Fw, Fg, P)i" and the solution variables in the reservoir grid blocks which communicate with the segment, block 146 in FIG. 19, (4) work out the flow between each segment and its neighboring segments which is a function of its solution variables "(Q, Fw, Fg, P)i" and the solution variables in the neighboring segments, block 148 in FIG. 19. In FIG. 20, (5) calculate the pressure drop along each segment which is a function of its solution variables "(Q, Fw, Fg, P)i", block 150 in FIG. 20; (6) since blocks 144, 146 and 148 in FIG. 19 represent three expressions in a Material Balance Equation for each segment, and since block 150 in FIG. 20 represents a Pressure Equation for each segment, determine the Material Balance Equation residuals and the Pressure Equation residuals for all segments in the well, the residuals being a function of the solution variables "(Q, Fw, Fg, P)i" for the segments and their neighboring segments and the solution variables in any reservoir grid blocks which communicate with the segments, block 152 of FIG. 20; (7) calculate the derivatives of the residuals, block 154 of FIG. 20; (8) ask the question "are the 'residuals' less than a tolerance value specified by the user?", block 156 of FIG. 20—if no, go to step "9" below—if yes, go to step "11" below; (9) since "no" was the answer to the question of block 156 of FIG. 20, use the derivatives of block 154 to calculate changes (delta Q, delta Fw, delta Fg, delta P) to the solution variables (Q, Fw, Fg, P) for all segments to reduce their residuals to a smaller value on the next iteration, block 158 of FIG. 20; (10) in FIG. 21, apply the changes (delta Q, delta Fw, delta Fg, delta P) to the solution variables (Q, Fw, Fg, P) of all segments to produce a new set of solution variables "(Q, Fw, Fg, P)i (new)" and go back to step "2" which is block 144 of FIG. 19, block 160 of FIG. 21; (11) since "yes" was the answer to block 156 of FIG. 20, in FIG. 22, the "four equations" comprising the three expressions of the material balance equation (blocks 144, 146, 148 of FIG. 19) and the pressure equation (block 150 of FIG. 20) are balanced—each segment "i" can be characterized by the solution variables "(Q. Fw, Fg, P)i"; block 162 of FIG. 22; (12) record and/or display the solution variables "(Q, Fw, Fg, P)i" for each segment "i", block 164 of FIG. 22. In FIG. 23, display or record on "recorder or display or 3D viewer" 44e of FIG. 5 all of the segments of each of the pipelines of the multilateral or single bore wellbore and the solution variables "(Q, Fw, Fg, P)" for each segment, block 140c of FIG. 18 and block 170 of FIG. 23.

A functional description of the operation of the 'Adjoint Method for Calculating and Using Adjoint Gradients' 70 of FIGS. 10 and 11 will be set forth in the following paragraphs with reference to FIGS. 1 through 23 of the drawings.

The 'Adjoint method for calculating and using adjoint gradients' step 70 of FIGS. 10 and 11 first involves running the Reservoir Simulator 74 of FIG. 12 in order to simulate the life of the reservoir. Outputs from this 'forward simulation' of the Simulator 74 are generated and processed thereby generating 'intermediate partial derivatives of the well and reservoir flow equations'. These 'intermediate partial derivatives of the well and reservoir flow equations' are combined inside the Reservoir Simulator 74 of FIG. 12. In the 'Adjoint Gradient Calculation' step 80 of FIG. 12, a solution of the large adjoint system of linear equations is then required, at regular time intervals, in order to calculate a 'set of adjoint gradients of the objective function 72a with respect to the control parameters 72b'. Thus, step 80 of FIG. 12 (i.e., the 'Adjoint Gradient Calculation' step 80) corresponds to step 70a of FIG. 11 (i.e., 'calculating adjoint gradients of an objective function with respect to changes in valve settings taking into account the modeling of pressure drop and fluid flow along a wellbore', step 70a). As a result, when the aforementioned 'intermediate partial derivatives of the well and reservoir flow equations' are combined inside the Reservoir Simulator 74 of FIG. 12, the 'Adjoint Gradient Calculation' step 80 of FIG. 12 will then generate a 'set of adjoint gradients of the objective function 72a with respect to the control parameters 72b'. In the 'Calculation of Search Direction' step 82 of FIG. 12, the 'set of adjoint gradients of the objective function 72a with respect to the control parameters 72b' (that were generated by step 80 of FIG. 12) are then used in the 'Calculation of Search Direction' step 82 to determine a 'search direction', that is, a suggested change to the control parameters that will not violate any production constraints, or limiting values of the parameters. Thus, step 82 of FIG. 12 (i.e., 'Calculation of Search Direction', step 82) corresponds to step 70b in FIG. 11 (i.e., 'using the adjoint gradients to calculate sensitivities of a reservoir to changes in parameterization of downhole devices and using of these sensitivities in the optimal control of the wells to optimize some objective function subject to production constraints', step 70b). This 'search direction' is given to the Optimizer 84 of FIG. 12. The Optimizer 84 includes an optimization algorithm that (when executed) maximizes the objective function 72a using line-search methods (recall from step 70b of FIG. 11 that the calculated sensitivities are used in the optimal control of the wells to optimize some objective function). When a local maximum (of the objective function 72a) has been located by the Optimizer 84 along the gradient-based search direction that was established by the 'calculation of search direction' step 82, or when a production constraint is encountered, the Optimizer 84 will then generate an 'Updated Well Control Schedule' 86 which includes a set of 'new updated control parameters' 72b. The 'new updated control parameters' 72b of the 'Updated Well Control Schedule' 86 are presented to the Reservoir Simulator 74, and, in particular, to the 'multi-segmented well model' 88 of the Reservoir Simulator 74. The Simulator 74 is re-run using the aforementioned 'new updated control parameters' 72b. The above referenced process or method is repeated; that is, a 'new set of adjoint gradients of the objective function 72a with respect to the control parameters 72b' is calculated by the 'Adjoint Gradient Calculation' step 80 of FIG. 12, a 'new search direction' is determined by the 'calculation of search direction' step 82 of FIG. 12, and a 'new Updated Well Control Schedule' 86 is generated by the Optimizer 84 of FIG. 12 until some 'termination criterion' has been satisfied. For example, the 'termination criterion' will be satisfied when 'convergence' has been achieved, and 'convergence' will be achieved when an 'optimal value of the objective function' has been reached.

When the 'multi-segmented well model' 88 of the Reservoir Simulator 74 receives the 'new updated control parameters' 72b of the 'Updated Well Control Schedule' 86, the 'multi-segmented well model' 88 will then determine a set of solution variables for each segment of each pipeline of the wellbore (step 140b of FIG. 18) and then display or record the segments of each pipeline and the sets of solution variables corresponding, respectively, to the segments (step 140c of FIG. 18). The 'multi-segmented well model' 88 will then generate two 'outputs': (1) the Reservoir Production Profiles 90, and (2) the Optimized Reservoir Production Profiles 92 of FIG. 12.

A functional specification associated with the 'Adjoint Method for Calculating and Using Adjoint Gradients' 70 of FIGS. 10, 11, and 12 is set forth in the following paragraphs.

Introduction

This specification includes software (namely, the 'Resopt' software that is embodied within the 'Eclipse' Simulator software $46b$ of FIGS. 6 and 7) that uses adjoint gradient technology to optimize production from a simulation model subject to constraints.

The Necessary Mathematics

Lagrange Formulation of the Objective Function with Constraints

In the objective function, we are trying to change the production control parameters, P, so that we maximize a quantity (e.g. FOPT) subject to the constraints that the simulator fluid flow residual equations, R=0, are satisfied, and also that additional production constraints, $C \leqq 0$, are satisfied.

Generally, production constraints are inequalities. For convenience, we will divide these into active (i.e. those for which currently C=0) and inactive constraints. For clarity, we will denote the active constraints by $C_A$.

Lagrange multipliers are used to combine the equality constraints with the objective function into the merit function, L, $$L(X,P) = J(X,P) + \underline{\Psi}_R \cdot R(X,P) + \underline{\Psi}_C \cdot C_A(X,P) \tag{1}$$

where J is the objective function, X is the vector of solution variables (e.g. pressure, saturations, molar densities), and $\underline{\Psi}_R$ and $\underline{\Psi}_C$ are the vectors of Lagrange multipliers on the equality constraints.

Backward Solve: Free Parameter Gradients

In order to determine a search direction for maximizing this objective function, we are interested in forming its total derivatives with respect to the production control parameters. This is $$\frac{dL}{dP} = \frac{\partial L}{\partial P} + \frac{\partial L}{\partial X}\frac{\partial X}{\partial P} \tag{2}$$

In order to calculate this, we need the solution derivatives, $\partial X/\partial P$, and also the following partial derivatives of the Lagrangian.

$$\frac{\partial L}{\partial X} = \frac{\partial J}{\partial X} + \Psi_R \cdot \frac{\partial R}{\partial X} + \Psi_C \cdot \frac{\partial C_A}{\partial X} \tag{3}$$

$$\frac{\partial L}{\partial P} = \frac{\partial J}{\partial P} + \Psi_R \cdot \frac{\partial R}{\partial P} + \Psi_C \cdot \frac{\partial C_A}{\partial P} \tag{4}$$

Since R=0 and $C_A$=0, then we are free to choose any values for $\underline{\Psi}_R$ and $\underline{\Psi}_C$ in (1). In particular, we can choose these vectors so that $\partial L/\partial X$=0 in (3). This removes the need to perform the expensive step of calculating $\partial X/\partial P$ in (2) and we then just need to evaluate (4) to get the Lagrangian gradient.

Hence, from (3), $$\frac{\partial J}{\partial X} + \Psi_R \cdot \frac{\partial R}{\partial X} + \Psi_C \cdot \frac{\partial C_A}{\partial X} = 0 \tag{5}$$

If there are $N_A$ active constraints and $N_1$ inactive constraints, then we have enough degrees of freedom to set $\partial L/\partial P_i$=0 for $N_A$ of the production control parameters. So, from (4), $$\frac{\partial J}{\partial P_i} + \Psi_R \cdot \frac{\partial R}{\partial P_i} + \Psi_C \cdot \frac{\partial C_A}{\partial P_i} = 0 \ \forall \ i \leq N_A \tag{6}$$

Original Formulation

We want to solve (5) and (6) simultaneously for the adjoint vectors. Re-arranging (6) gives, $$\Psi_C^T = -\left\{\frac{\partial J}{\partial P_i} + \left(\Psi_R \cdot \frac{\partial R}{\partial P_i}\right)\right\}\left(\frac{\partial C_A}{\partial P_i}\right)^{-1} \ \forall \ i \leq N_A \tag{7}$$

Substituting (7) in (5) and re-arranging gives, $$\Psi_R \cdot \left\{\frac{\partial R}{\partial X} - \frac{\partial R}{\partial P_i}\left(\frac{\partial C_A}{\partial P_i}\right)^{-1}\frac{\partial C_A}{\partial X}\right\} = \tag{8}$$

$$-\frac{\partial J}{\partial X} + \frac{\partial J}{\partial P_i}\left(\frac{\partial C_A}{\partial P_i}\right)^{-1}\frac{\partial C_A}{\partial X} \ \forall \ i \leq N_A$$

Equation (8) involves the solution of a system of equations in which the matrix, $\partial R/\partial X$, is very large. R is the vector of residual equations at all time intervals, and X is the vector of solution variables at all time intervals. In practice, it is possible take advantage of structure in the total Jacobian matrix, $\partial R/\partial X$, to reduce the size of the system that needs to be solved.

Since $R(t_j)=R(X(t_j),X(t_{j-1}),P)$, then the total Jacobian matrix is a block lower triangular (so its transpose is block upper triangular), $$\left(\frac{\partial R}{\partial X}\right)^T = \begin{bmatrix} \left(\frac{\partial R(t_1)}{\partial X(t_1)}\right)^T & \left(\frac{\partial R(t_2)}{\partial X(t_1)}\right)^T & 0 & 0 & \cdots & 0 & 0 \\ 0 & \left(\frac{\partial R(t_2)}{\partial X(t_2)}\right)^T & \left(\frac{\partial R(t_3)}{\partial X(t_2)}\right)^T & 0 & \cdots & 0 & 0 \\ 0 & 0 & \left(\frac{\partial R(t_3)}{\partial X(t_3)}\right)^T & \left(\frac{\partial R(t_4)}{\partial X(t_3)}\right)^T & \cdots & 0 & 0 \\ 0 & 0 & 0 & \ddots & \ddots & \vdots & \vdots \\ \vdots & \vdots & \vdots & \ddots & \ddots & \vdots & \vdots \\ 0 & 0 & 0 & 0 & \cdots & \left(\frac{\partial R(t_{n-1})}{\partial X(t_{n-1})}\right)^T & \left(\frac{\partial R(t_n)}{\partial X(t_{n-1})}\right)^T \\ 0 & 0 & 0 & 0 & \cdots & 0 & \left(\frac{\partial R(t_n)}{\partial X(t_n)}\right)^T \end{bmatrix}$$

The diagonal matrices are the Jacobian matrices from each time interval, $Jac(t_j)$. In RESOPT, these are reconstructed from the contents of the restart file that were saved at each report step of the forward simulation.

Since the simulator residual equations can be written as $$R(t_{j+1}) = M(t_{j+1}) - M(t_j) + \Delta t \{F(t_{j+1}) + Q(t_{j+1})\}$$

and $M(t_j) = \text{PoreVolume}(t_j)\,\text{MolarDensity}(t_j)$ then $$\frac{\partial R(t_{j+1})}{\partial X(t_j)} = -\frac{\partial M(t_j)}{\partial X(t_j)}$$

$$= -\frac{\partial M}{\partial X}\bigg|_{t_j}$$

$$= \begin{cases} -\text{PoreVolume}(t_j) & \text{for } X = \text{MolarDensity}(t_j) \\ -\text{MolarDensity}(t_j)\dfrac{\partial(\text{PoreVolume})}{\partial(\text{Pressure})}\bigg|_{t_j} & \text{for } X = \text{Pressure}(t_j) \end{cases}$$

So the total Jacobian matrix can be written as $$\left(\frac{\partial R}{\partial X}\right)^T = \begin{bmatrix} Jac(t_1)^T & -\left(\frac{\partial M}{\partial X}\big|_{t_1}\right)^T & 0 & 0 & \cdots & 0 & 0 \\ 0 & Jac(t_2)^T & -\left(\frac{\partial M}{\partial X}\big|_{t_2}\right)^T & 0 & \cdots & 0 & 0 \\ 0 & 0 & Jac(t_3)^T & -\left(\frac{\partial M}{\partial X}\big|_{t_3}\right)^T & \cdots & 0 & 0 \\ 0 & 0 & 0 & \ddots & \ddots & \vdots & \vdots \\ \vdots & \vdots & \vdots & \ddots & \ddots & \vdots & \vdots \\ 0 & 0 & 0 & 0 & \cdots & Jac(t_{n-1})^T & -\left(\frac{\partial M}{\partial X}\big|_{t_{n-1}}\right)^T \\ 0 & 0 & 0 & 0 & \cdots & 0 & Jac(t_n)^T \end{bmatrix}$$

$$\qquad\qquad\qquad\qquad 40$$

If we specify the parameters, $P_i$, and constraints, $C_A$, so that each applies to a particular time interval, then the entire system (8) becomes the following sequence of smaller systems:

$$\left\{Jac(t_j) - \frac{\partial R}{\partial P_i}\bigg|_{t_j}\left(\frac{\partial C_A}{\partial P_i}\bigg|_{t_j}\right)^{-1}\frac{\partial C_A}{\partial X}\bigg|_{t_j}\right\}^T \Psi_R(t_j) = \qquad (9)$$

$$\left\{-\frac{\partial J}{\partial X}\bigg|_{t_j} + \frac{\partial J}{\partial P_i}\bigg|_{t_j}\left(\frac{\partial C_A}{\partial P_i}\bigg|_{t_j}\right)^{-1}\frac{\partial C_A}{\partial X}\bigg|_{t_j} + \Psi_R(t_{j+1})\frac{\partial M}{\partial X}\bigg|_{t_j}\right\}^T$$

for $t_j = t_1, \ldots, t_n$, with $\underline{\Psi}_R(t_n) = 0$. We can solve the $n^{th}$ equation first and then solve the other equations backwards to solve the entire system. For some insight into the $\partial M/\partial X$ term, consider a small two cell example with three components (including water). The matrix has the following form:

| | | Cell 1 solution variables | | | | Cell 2 solution variables | | | |
|---|---|---|---|---|---|---|---|---|---|
| | | P | $m_1$ | $m_2$ | $M_3$ | P | $m_1$ | $m_2$ | $m_3$ |
| Cell 1 equations | Conservation of component 1 | $-m_1\dfrac{dPV}{dP}$ | -PV | 0 | 0 | | | | |
| | Conservation of component 2 | $-m_2\dfrac{dPV}{dP}$ | 0 | -PV | 0 | | 0 | | |
| | Conservation of component 3 | $-m_3\dfrac{dPV}{dP}$ | 0 | 0 | -PV | | | | |
| | Volume balance | 0 | 0 | 0 | 0 | | | | |

| | | | | | | | | |
|---|---|---|---|---|---|---|---|---|
| Cell 2 equations | Conservation of component 1 | | | | | $-m_1 \dfrac{dPV}{dP}$ | $-PV$ | 0 | 0 |
| | Conservation of component 2 | | | 0 | | $-m_2 \dfrac{dPV}{dP}$ | 0 | $-PV$ | 0 |
| | Conservation of component 3 | | | | | $-m_3 \dfrac{dPV}{dP}$ | 0 | 0 | $-PV$ |
| | Volume balance | | | | | 0 | 0 | 0 | 0 |

Hence, for a particular cell, the product of this matrix with a vector multiplying from the left, such as $$\Psi_R(t_{j+1}) \cdot \frac{\partial M}{\partial X}\bigg|_{t_j}$$

has the form . . .

$$\left[ -\frac{dPV}{dP} \cdot \sum_{i=1}^{3} m_i \cdot \Psi_R^i \quad -\Psi_R^1 \cdot PV \quad -\Psi_R^2 \cdot PV \quad -\Psi_R^3 \cdot PV \right]$$

In RESOPT, the sequence of calculations is as follows:
Working backwards through the time intervals . . .
    Set up the required derivative matrices
    Solve (9) for the $\underline{\Psi}_R(t_j)$
    Solve the time-interval equivalent of (7) for $\underline{\Psi}_C(t_j)$
    Use the time-interval equivalent of (4) to compute the Lagrangian derivatives for the current time interval free production control parameters, $\partial L/\partial P(t_j)$. (There is no need to calculate for the first $N_A$ production control parameters as we have already set these to zero.)

This process requires 1 solve of the transpose simulation Jacobian matrices, followed by 1 solve of a small matrix system (order of number of active constraints). Total: 1 transpose Jacobian matrix solve.

Alternative Formulation

In the case where the active constraints are not sensitive to the dependent parameters, i.e. $\partial C_A/\partial P_i=0$, we cannot solve (5) and (6) by eliminating $\underline{\Psi}_C$ and then solving for $\underline{\Psi}_R$. Instead we must take the more costly approach of eliminating $\underline{\Psi}_R$ (which may involve multiple $\partial R/\partial X$ solves) and then solving for $\underline{\Psi}_C$.

Re-arranging (5) gives, $$\Psi_R^T = \left\{ -\frac{\partial J}{\partial X} - \Psi_C \cdot \frac{\partial C_A}{\partial X} \right\} \left( \frac{\partial R}{\partial X} \right)^{-1} \quad (10)$$

As before, if we specify the parameters, $P_i$, and constraints, $C_A$, so that each applies to a particular time interval, and remembering the time-structure of $(\partial R/\partial X)^T$, then the entire system (10) becomes:

$$\Psi_R^T(t_j) = \left\{ -\frac{\partial J}{\partial X}\bigg|_{t_j} - \Psi_C(t_j) \cdot \frac{\partial C_A}{\partial X}\bigg|_{t_j} + \Psi_R(t_{j+1}) \cdot \frac{\partial M}{\partial X}\bigg|_{t_j} \right\} \{Jac(t_j)\}^{-1} \quad (11)$$

for $t_j=t_1, \ldots, t_n$, with $\underline{\Psi}_R(t_n)=0$. Substituting (11) into the time-interval equivalent of (6) gives, $$\Psi_C(t_j) \cdot \left\{ \frac{\partial C_A}{\partial P_i}\bigg|_{t_j} - \frac{\partial C_A}{\partial X}\bigg|_{t_j} \{Jac(t_j)\}^{-1} \frac{\partial R}{\partial P_i}\bigg|_{t_j} \right\} = -\frac{\partial J}{\partial P_i}\bigg|_{t_j} - \left( -\frac{\partial J}{\partial X}\bigg|_{t_j} + \underline{\Psi}_R(t_{j+1}) \frac{\partial M}{\partial X}\bigg|_{t_j} \right) \{Jac(t_j)\}^{-1} \frac{\partial R}{\partial P_i}\bigg|_{t_j} \forall\, i \le N_A \quad (12)$$

We keep the $\partial C_A/\partial P_i$ term here because we want to be able to handle cases where some active constraints are insensitive to the parameters, so $\partial C_A/\partial P_i \approx 0$ in some sense.

When solving (11), we are solving a transpose system involving the simulator Jacobian matrices so, as in the normal formulation, we solve this system backwards in time. In order to use the same "backwards in time" philosophy when solving (12), we re-write it as $$\Psi_C(t_j) \cdot \left\{ \frac{\partial C_A}{\partial P_i}\bigg|_{t_j} + [\Phi_{A,1}, \cdots, \Phi_{A,N_A}] \frac{\partial R}{\partial P_i}\bigg|_{t_j} \right\} = \frac{\partial J}{\partial P_i}\bigg|_{t_j} - \Phi_J \frac{\partial R}{\partial P_i}\bigg|_{t_j} \quad (13)$$

$\forall\, i \le N_A$
where $$\{Jac(t_j)\}^T \Phi_J = \left\{ -\frac{\partial J}{\partial X}\bigg|_{t_j} + \underline{\Psi}_R(t_{j+1}) \cdot \frac{\partial M}{\partial X}\bigg|_{t_j} \right\}^T \quad (14a)$$

and $$\{Jac(t_j)\}^T \Phi_k = \left\{ -\frac{\partial C_{A,k}}{\partial X}\bigg|_{t_j} \right\}^T \quad (14b)$$

We can solve the $n^{th}$ equations of (14) first and then solve the other equations backwards to solve the entire system.

Note that if $N_A=0$, then we only solve for $\underline{\Phi}_j(t_j)$ and can arbitrarily set $\underline{\Phi}_k(t_j)=0$ for all other k.

In a similar way, we can solve the $n^{th}$ equation of (11) first and then solve the other equations backwards to solve the entire system. Note that if $N_A=0$ at a particular time interval, $t_j$, then (11) reduces to $\underline{\Psi}_R(t_j)=\underline{\Phi}_j(t_j)$ In RESOPT, the sequence of calculations should be as follows:
Working backwards through the time intervals . . .
  Set up the required derivative matrices (this is already done)
  Solve (14) for the each of the $\underline{\Phi}_k(t_j)$
  Solve (13) for $\underline{\Psi}_C(t_j)$
  Solve (11) for $\underline{\Psi}_R(t_j)$
Use the time-interval equivalent of (4) to compute the Lagrangian derivatives for the current time interval free production control parameters, $\partial L/\partial P(t_j)$. (There is no need to calculate for the first $N_A$ production control parameters as we have already set these to zero.)

This process requires $1+N_A$ solves of the transpose simulation Jacobian matrices, followed by 1 solve of a small matrix system (order of number of active constraints), and then followed by $\text{sgn}(N_A)$ solve of the transpose simulation Jacobian matrices. Total: $1+\text{sgn}(N_A)+N_A$ transpose Jacobian matrix solves.

Selection of the Free and Dependent Parameter Sets

In the code, there are $N_A$ ($=N_d$=NOCONL) dependent production control parameters and $N_1$ ($=N_f$=NOPARL−NOCONL) free production control parameters at each time level.

Pre-2006a, only a very simple partitioning of the parameters was used: make the first $N_A$ parameters dependent and treat the rest as free.

At 2006a, some logic was added so that the ones with the largest $\partial C_A/\partial P$ diagonal values (normal approach) or largest $\partial R/\partial P$ column sum (alternative approach) are taken as the free parameters. This logic uses an indirection indexing array, IDXP, to convert from the original parameter order to the sorted order. Original arrays such as $\partial R/\partial P$, $\partial F/\partial P$, etc. are stored in original order (as they are calculated before the parameter split. Intermediate arrays, such as $(\partial C/\partial P)^{-1}$ are stored in local order.

Free Parameter Search Direction

Once we have successfully stepped backwards over all the time intervals, we have the complete vector of Lagrangian derivatives, $\partial L/\partial P$, for the free production control parameters. We use these to determine the free production control parameter search step, $\Delta P_f$, (using either steepest descent or conjugate gradients in the current code).

Forward Integration: Dependent Parameter Search Direction

For any $\Delta P_f$, the linearized forms of the perturbed reservoir constraint equations and the active optimization constraint equations give $$\frac{\partial R}{\partial X}\Delta X + \frac{\partial R}{\partial P_d}\Delta P_d + \frac{\partial R}{\partial P_f}\Delta P_f = 0 \tag{15}$$

$$\frac{\partial C_A}{\partial X}\Delta X + \frac{\partial C_A}{\partial P_d}\Delta P_d + \frac{\partial C_A}{\partial P_f}\Delta P_f = 0 \tag{16}$$

Hence the $N_A$ active constraint equations can be seen as a partitioning of the production control parameters, P, into $\{P_d, P_f\}$ where the first $N_A$ production control parameters, $P_d$, are dependent on the remaining (free) ones, $P_f$, through the (generally non-linear) constraint and (definitely non-linear) reservoir equations.

Original Formulation
Re-arranging (16) gives $$\Delta P_d = -\left(\frac{\partial C_A}{\partial P_d}\right)^{-1}\left(\frac{\partial C_A}{\partial P_f}\Delta P_f + \frac{\partial C_A}{\partial X}\Delta X\right) \tag{17}$$

Substituting (17) into (15) gives $$\left\{\begin{array}{c}\frac{\partial R}{\partial X} - \\ \frac{\partial R}{\partial P_d}\left(\frac{\partial C_A}{\partial P_d}\right)^{-1}\frac{\partial C_A}{\partial X}\end{array}\right\}\Delta X = -\left\{\frac{\partial R}{\partial P_f} - \frac{\partial R}{\partial P_d}\left(\frac{\partial C_A}{\partial P_d}\right)^{-1}\frac{\partial C_A}{\partial P_f}\right\}\Delta P_f$$

We split this system into smaller ones, each covering a time interval. We denote the Jacobian for the reservoir equations $$\frac{\partial R}{\partial X}$$

by Jac in what follows:

$$\left\{\begin{array}{c}Jac(t_j) - \frac{\partial R}{\partial P_d}\bigg|_{t_j} \\ \left(\frac{\partial C_A}{\partial P_d}\bigg|_{t_j}\right)^{-1}\frac{\partial C_A}{\partial X}\bigg|_{t_j}\end{array}\right\}\Delta X(t_j) = -\left\{\begin{array}{c}\frac{\partial R}{\partial P_f}\bigg|_{t_j} - \frac{\partial R}{\partial P_d}\bigg|_{t_j} \\ \left(\frac{\partial C_A}{\partial P_d}\bigg|_{t_j}\right)^{-1}\frac{\partial C_A}{\partial P_f}\bigg|_{t_j}\end{array}\right\} \tag{18}$$

$$\Delta P_f(t_j) + \frac{\partial M}{\partial X}\bigg|_{t_{j-1}}$$

$$\Delta X(t_{j-1})$$

for $t_j=t_1, \ldots t_n$, with $\Delta X(t_0)=0$. We can solve this sequence of systems forwards to solve the entire system. Using the same small example (with three components) as before to gain insight into the formation of the $$\frac{\partial M}{\partial X}\bigg|_{t_{j-1}}\Delta X(t_{j-1})$$

term (in which the matrix is multiplied by a vector from the right), gives the following for a particular cell . . .

$$\begin{bmatrix}-m_1 \cdot (dPV/dP) \cdot \Delta X_P - PV \cdot \Delta X_1 \\ -m_2 \cdot (dPV/dP) \cdot \Delta X_P - PV \cdot \Delta X_2 \\ -m_3 \cdot (dPV/dP) \cdot \Delta X_P - PV \cdot \Delta X_3 \\ 0\end{bmatrix}$$

In RESOPT, following on from the previous calculations, the sequence of these additional calculations is:
Working forwards through the time intervals . . .
  Solve (18) for $\Delta X(t_j)$
  Solve the equivalent of (17) for $P_d(t_j)$ This process requires 1 solve of the simulation Jacobian matrices, followed by 1 solve of a small matrix system (order of number of active constraints). Total: 1 Jacobian matrix solve.

Alternative Formulation

If the active constraints are not sensitive to the dependent parameters, then we cannot use (17) to eliminate the dependent parameters and then solve for $\Delta X$ and $P_d$, so instead we have to use (15) to eliminate $\Delta X$. From (15), $$\Delta X = -\left(\frac{\partial R}{\partial X}\right)^{-1}\left(\frac{\partial R}{\partial P_d}\Delta P_d + \frac{\partial R}{\partial P_f}\Delta P_f\right) \quad (19)$$

As before, if we specify the parameters, $P_i$, and constraints, $C_A$, so that each applies to a particular time interval, and remembering the time-structure of $\partial R/\partial X$, then the entire system (19) becomes:

$$\Delta X(t_j) = -\{Jac(t_j)\}^{-1}\left(\begin{array}{l}\left.\frac{\partial R}{\partial P_d}\right|_{t_j}\Delta P_d(t_j) + \left.\frac{\partial R}{\partial P_f}\right|_{t_j}\\ \Delta P_f(t_j) - \left.\frac{\partial M}{\partial X}\right|_{t_{j-1}}\Delta X(t_{j-1})\end{array}\right) \quad (20)$$

for $t_j = t_1, \ldots, t_n$. Substituting (19) into the time-interval equivalent of (16) gives, $$\left\{\begin{array}{l}\left.\frac{\partial C_A}{\partial P_d}\right|_{t_j} - \left.\frac{\partial C_A}{\partial X}\right|_{t_j}\\ \{Jac(t_j)\}^{-1}\left.\frac{\partial R}{\partial P_d}\right|_{t_j}\end{array}\right\}\Delta P_d(t_j) = \left.\frac{\partial C_A}{\partial P_f}\right|_{t_j}\Delta P_f(t_j) - \quad (21)$$

$$\left.\frac{\partial C_A}{\partial X}\right|_{t_j}\{Jac(t_j)\}^{-1}$$

$$\left\{\begin{array}{l}\left.\frac{\partial M}{\partial X}\right|_{t_{j-1}}\Delta X(t_{j-1}) -\\ \left.\frac{\partial R}{\partial P_f}\right|_{t_j}\Delta P_f(t_j)\end{array}\right\}$$

for $t_j = t_1, \ldots, t_n$, with $\Delta X(t_0) = 0$. We can solve this sequence of systems forwards to solve the entire system. In order to solve this system for $P_d$, we first need to solve the following set of $(N_A + 1)$ systems for $$\Delta \tilde{\Phi}_f, \Delta \tilde{\Phi}_1, \Delta \tilde{\Phi}_2, \ldots, \Delta \tilde{\Phi}_{N_A},$$

$$Jac(t_j)\tilde{\Phi}_f(t_j) = \left.\frac{\partial R}{\partial P_f}\right|_{t_j}\Delta P_f(t_j) + \left.\frac{\partial M}{\partial X}\right|_{t_{j-1}}\Delta X(t_{j-1}) \quad (22a)$$

$$Jac(t_j)\tilde{\Phi}_k = \left.\frac{\partial R}{\partial P_k}\right|_{t_j} \forall k \in N_A \quad (22b)$$

Then (21) becomes $$\left\{\begin{array}{l}\left.\frac{\partial C_A}{\partial P_d}\right|_{t_j} + \left.\frac{\partial C_A}{\partial X}\right|_{t_j}\\ [\tilde{\Phi}_1, \tilde{\Phi}_2, \ldots, \tilde{\Phi}_{N_A}]\end{array}\right\}\Delta P_d(t_j) = \left.\frac{\partial C_A}{\partial P_f}\right|_{t_j}\Delta P_f(t_j) - \quad (23)$$

$$\left.\frac{\partial C_A}{\partial X}\right|_{t_j}\tilde{\Phi}_f$$

Note that if $N_A = 0$ at a particular time interval, $t_j$, then (20) reduces to $\Delta X(t_j) = \tilde{\Phi}_f(t_j)$.

In RESOPT, following on from the previous calculations, the sequence of these additional calculations is:

Working forwards through the time intervals . . .
Solve (22) for $\tilde{\Phi}_f(t_j)$ and each of the $\tilde{\Phi}_k(t_j)$
Solve (23) for $P_d(t_j)$
Solve (20) for $X(t_j)$—which is needed later This process requires $1 + N_A$ solves of the simulation Jacobian matrices, followed by 1 solve of a small matrix system (order of number of active constraints), and then followed by $sgn(N_A)$ solves of the simulation Jacobian matrices. Total: $1 + sgn(N_A) + N_A$ Jacobian matrix solves.

Calculating the Step Length

Ensuring that we do not Violate the Constraint Functions

Given that we have a search direction for the production control parameters, P, we next need to know the step length. From (18), we know if we step a distance $\alpha$ along $\Delta X$ then we should also step a distance $\alpha$ along $\Delta P$. The active constraint equations will be satisfied inherently, but we must not violate any of the currently inactive ones, so we are interested in how far we can step before we would violate the inactive constraints. In order to hit an inactive constraint at this step, $$C_i(X + \alpha \Delta X, P_f + \alpha \Delta P_f) = 0 \forall i \leq N_I$$

Expanding this to first order and re-arranging gives $$\alpha = \frac{-C_i(X, P_f)}{\left(\frac{\partial C_i}{\partial X}\Delta X + \frac{\partial C_i}{\partial P_f}\Delta P_f\right)} \forall i \leq N_I$$

The closest constraint (i.e. the one that would be first violated if an unrestricted amount of the search direction were used) is the one with the minimum value of $\square$.

$$\alpha = \min_i \left\{\frac{-C_i(X, P_f)}{\left(\frac{\partial C_i}{\partial X}\Delta X + \frac{\partial C_i}{\partial P_f}\Delta P_f\right)}\right\} \quad (24)$$

In RESOPT, following on from the previous calculations, the sequence of additional calculations is as follows:

Solve (24) for the minimum value of $\alpha$

Ensuring that the Simple Parameter Bounds are not Violated

In RESOPT, the user can impose simple bounds on the production control parameter values such as $$P_{Li} \leq P_i \leq P_{Ui}$$

When taking a step in the optimizer, we need to restrict the production control parameter step length by a factor $\beta$ to ensure that do not violate any of these simple bounds. By default, $\beta$ is one.

If a production control parameters new value is greater than its upper bound, then $$\beta = \frac{P_{Ui} - P_i^{new}}{\Delta P_i} \quad (25a)$$

If a production control parameters new value is less than its lower bound, then $$\beta = \frac{P_i^{new} - P_{Li}}{\Delta P_i} \quad (25b)$$

In RESOPT, following on from the previous calculations, the sequence of additional calculations is as follows:

Loop over all production control parameters, if necessary, solving (25) for β and then modifying the control parameter step length.

Finally in RESOPT, we conduct a line-search along the search direction to complete this step of the optimizer.

Once we have exited the line-search, we look for the next production control parameter step direction.

Sub-Functions in the Adjoint Optimizer Code

The objective function in the adjoint optimizer, J, can take the following general form:

$$J = \sum_i C_i J_i$$

This is a summation over sub-functions, $J_i$. Here $C_i$ is specified for each sub-function in the OPTFUNC keyword and the sub-function, $J_i$, is given by $$J_i = \sum_{t=t_1(i)}^{t_2(i)} d_i(t) f_i(t) \Delta t$$

where $f_i(t)$ denotes an injected or produced fluid rate (e.g. field oil production rate), $t_1(i)$ and $t_2(i)$ are specified for each sub-function in the OPTFUNC keyword, and the time-dependent discount factor is given by $$d_i(t) = (1 + r_i)^{-(t_{years})}$$

where the annual discount rate, $r_i$, is specified in the OPTFUNC keyword, and $t_{years}$ is the fractional time in years.

Multiple Components in the Objective Function

The user can specify multiple sub-functions in the OPTFUNC keyword. For example, optimize field oil production while penalizing water production from well 'PROD' between timesteps 2 and 7:

```
OPTFUNC
     'FOPT'  FIELD        /
     'WWPT'  PROD   -1.0  0.0  2  7  /
/
```

This keyword defines the following define the sub-functions:

| i | Domain | Type | Fluid phase | Fluid type | $C_i$ | $r_i$ | $t_1(i)$ | $t_2(i)$ |
|---|--------|------|-------------|------------|-------|-------|----------|----------|
| 1 | Field  | Total | Oil | Production | +1 | 0 | 1 | end |
| 2 | Well PROD | Total | Water | Production | −1 | 0 | 2 | 7 |

Constraints Handled as Sub-Functions

Each constraint is included in the objective function as a pair of additional sub-functions, $f_{2j-1}$ and $f_{2j}$. The Lagrange multiplier will multiply these constraint sub-functions in order to incorporate them in the objective function.

$$L(\underline{\lambda}) = J(\underline{\lambda}) - \Phi f(\underline{\lambda})$$
$$= J(\underline{\lambda}) - \Phi \left( \sum_i f_i(\underline{\lambda}) \right)$$

This sub-function approach has the advantage that the gradients of the sub-functions can be accumulated to give the gradient of the function.

Simple Constraints

These are limits on the simulation quantities themselves. For example, the production rate must not exceed 2000 in well PROD. The constraint is re-written as follows:

WOPR≦2000

WOPR−2000≦0

This is handled as the following pairs of sub-functions (one pair for each report index at which the constraint is active):

| i | Domain | Type | Fluid phase | Fluid type | $C_i$ | $r_i$ | $t_1(i)$ | $t_2(i)$ |
|---|--------|------|-------------|------------|-------|-------|----------|----------|
| 2j−1 | Well PROD | Rate | Oil | Production | 1 | — | All $t_k(i)$ | $t_1(i)$ |
| 2j | Well PROD | Constant | — | — | −2000 | — | All $t_k(i)$ | $t_1(i)$ |

If a "greater than" constraint is specified, the constraint is re-written as follows:

WOPR≧50

−WOPR+50≦0

This is handled as the following pairs of sub-functions (one pair for each report index at which the constraint is active):

| i | Domain | Type | Fluid phase | Fluid type | $C_i$ | $r_i$ | $t_1(i)$ | $t_2(i)$ |
|---|---|---|---|---|---|---|---|---|
| 2j−1 | Well PROD | Rate | Oil | Production | −1 | — | All $t_k(i)$ | $t_1(i)$ |
| 2j | Well PROD | Constant | — | — | 50 | — | All $t_k(i)$ | $t_1(i)$ |

Complex Constraints 1 (GOR)

These are limits on derived simulation quantities. For example, the gas-oil ratio must not exceed 1.5 in well PROD. The constraint is re-written as follows:

$$WGOR \leq 1.5$$

$$\frac{WGPR}{WOPR} \leq 1.5$$

$$WGPR - (1.5)WOPR \leq 0$$

This is handled as the following pairs of sub-functions (one pair for each report index at which the constraint is active):

| i | Domain | Type | Fluid phase | Fluid type | $C_i$ | $r_i$ | $t_1(i)$ | $t_2(i)$ |
|---|---|---|---|---|---|---|---|---|
| 2j−1 | Well PROD | Rate | Gas | Production | 1 | — | All $t_k(i)$ | $t_1(i)$ |
| 2j | Well PROD | Rate | Oil | Production | −1.5 | — | All $t_k(i)$ | $t_1(i)$ |

Complex Constraints 2 (WCT)

As another example, the water cut must not exceed 0.2 in well PROD. The constraint is re-written as follows:

$$WWCT \leq 0.2$$

$$\frac{WWPR}{WWPR + WOPR} \leq 0.2$$

$$WWPR - \left(\frac{0.2}{1 - 0.2}\right)WOPR \leq 0$$

This is handled as the following pairs of sub-functions (one pair for each report index at which the constraint is active):

| i | Domain | Type | Fluid phase | Fluid type | $C_i$ | $r_i$ | $t_1(i)$ | $t_2(i)$ |
|---|---|---|---|---|---|---|---|---|
| 2j−1 | Well PROD | Rate | Water | Production | 1 | — | All $t_k(i)$ | $t_1(i)$ |
| 2j | Well PROD | Rate | Oil | Production | −0.25 | — | All $t_k(i)$ | $t_1(i)$ |

Normalization of Constraints

When comparing constraint functions to see which is the most binding, we need to normalize them so that we can make a far comparison between constraints on data type with vastly different units.

Simple Constraints

For simple constraints, the constraint value is the obvious choice. For example, to normalize $$WOPR - 2000 \leq 0$$

use 2000 to change it to $$\frac{WOPR}{2000} - 1 \leq 0$$

So the normalizing factor is the constraint value.

Complex GOR Constraint

For a GOR constraint, the constraint has been transformed from . . .

$$WGOR - 1.5 \leq 0$$

to the following which can be written as sub-functions . . .

$$WGPR - (1.5)WOPR \leq 0$$

If we were to normalize the original constraint equation, we would divide by the constraint value (as we did in the case of simple constraints). This would give . . .

$$\left(\frac{1}{1.5}\right)\frac{WGPR}{WOPR} - 1 \leq 0$$

So the normalizing factor that needs to be applied to the pair of sub-functions in order to get the same result as normalizing the original constraint equation is 1.5 times OPR.

Hence the normalizing factor is the constraint times the oil production rate in the domain of the constraint.

Complex WCT Constraint

For a WCT constraint, the constraint has been transformed from . . .

$$WWCT - 0.2 \leq 0$$

to the following which can be written as sub-functions . . .

$$WWPR - \left(\frac{0.2}{1.0 - 0.2}\right)WOPR \leq 0$$

If we were to normalize the original constraint equation, we would divide by the constraint value (as we did in the case of simple constraints). This would give . . .

$$\left(\frac{1}{0.2}\right)\frac{WWPR}{(WOPR + WWPR)} - 1 \leq 0$$

So the normalizing factor that needs to be applied to the pair of sub-functions in order to get the same result as normalizing the original constraint equation is 0.2 times the sum of OPR and WPR.

Hence the normalizing factor is the constraint times the sum of the oil and water production rates in the domain of the constraint.

Handling of RESTARTS

In a non-restarted deck, the scope of the functions, sub-functions, parameters and constraints in RESOPT is the same as that of the simulation (i.e. 1 to NTOTRS is the same as 1 to NOPTIM) so we can use the same indexing in both areas of the code and we can compare optimizer step index with the simulation report index.

In a restarted deck, the scope of the simulation is IRESTZ+1 to NTOTRS, while the scope of the storage in the RESOPT code is 1 to NOPTIM(=NTOTRS−IRESTZ). We use the RESOPT scope internally because it is efficient for storage.

Hence the SOPT array (which holds to double precision optimizer run time information such as the current time value and the size of time steps) is indexed from 1 to NOPTIM. Many of the arrays holding information and results for parameters are indirectly indexed using this optimizer scope also.

These two scoping methods are shown in the table below:

| | Scope | First Index | Last Index |
|---|---|---|---|
| Non-restart case | Simulation | 1 | NTOTRS |
| | Optimization | 1 | NOPTIM (=NTOTRS) |
| Restart case | Simulation | IRESTZ + 1 | NTOTRS |
| | Optimization | 1 | NOPTIM (=NTOTRS − IRESTZ) |

In the RESOPT code, we only use the simulation report indices in the following situations:
1. When defaulting and validating the range of functions, parameters and constraints
2. When storing the scope for functions, sub-functions, parameters and constraints
3. When comparing the scope for functions, sub-functions, parameters and constraints
4. When outputting a report index for the user To convert from optimizer step index (ISTEP) to simulation report index (JSTEP), just add IRESTZ. The standard mechanism in the code is to just do this locally when required, e.g. JSTEP=ISTEP+IRESTZ Array Naming Convention for Adjoint Optimizer Code Typical arrays in the adjoint optimizer code are IOPP, SOPP, ZOPP, IOPF, SOPF, IOPS, SOPS, ZOPS and SOPG. The naming convention for these arrays is as follows:

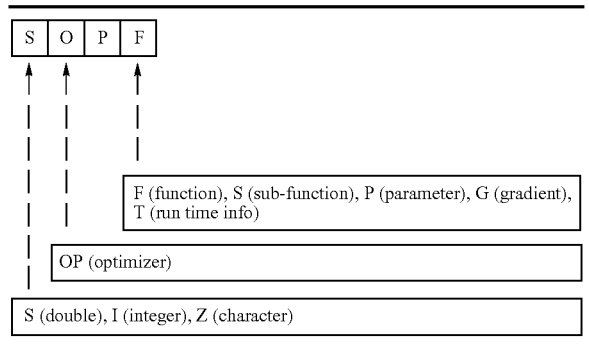

Debug Flags
These flags all apply to DEBUG3
120
Optimizer output (generally OP* routines)
121
Adjoint gradient calculation output level (generally GA* routines)
124
Whether to do a full solution when solving the well tree ("voidage replacement bodge")
125
To change the "-exponent" in numerical perturbations
126
To change which derivatives are calculated numerically
143
Use central differences in numerical gradient calculation The above description of the 'Adjoint Method of Calculating Gradients' being thus described, it will be obvious that the same may be varied in many ways. Such variations are not to be regarded as a departure from the spirit and scope of the claimed method or apparatus or program storage device, and all such modifications as would be obvious to one skilled in the art are intended to be included within the scope of the following claims.

We claim:

1. A method for optimizing production of a reservoir having one or more wells having downhole valves, comprising:
(a) running, using a processor, a reservoir simulator in a forward simulation to generate a multi-segmented well model;
(b) processing, using the processor, outputs from the multi-segmented well model to generate intermediate partial derivatives of flow equations for the one or more wells and for the reservoir;
(c) combining, using the processor, the intermediate partial derivatives of the well flow equations and the reservoir flow equations in the reservoir simulator;
(d) solving, using the processor, an adjoint system of linear equations at regular time intervals to calculate a set of adjoint gradients of an objective function with respect to control parameters associated with the downhole valves;
(e) determining, using the processor, from the adjoint gradients a search direction;
(f) using the search direction to solve, using the processor, an optimization algorithm that maximizes an objective function using line-search methods;
(g) locating, using the processor, a local maximum along the search direction and updating the control parameters;
(h) using the new updated control parameters in the reservoir simulator to generate, using the processor, an updated multi-segmented well model;
(i) repeating steps (a)-(i) until the updated multi-segmented well model converges on a maximized value of the objective function; and
(j) adjusting control of the one or more wells in the reservoir based on the updated multi-segmented well model.

2. The method of claim 1, wherein the control parameters comprise well production, injection rates, and injection pressures.

3. The method of claim 1, wherein the control parameters comprise configurations of down-hole inflow control devices.

4. The method of claim 1, wherein the maximized value of the objective function is a quantity of cumulative oil production subject to production constraints.

5. The method of claim 1, wherein the set of adjoint gradients comprise pressure drop and fluid flow from the multi-segmented well model.

6. A program storage device readable by a machine tangibly embodying a set of instructions executable by the machine to perform method steps for optimizing production of a reservoir having one or more wells having downhole valves, said method steps comprising:

(a) running a reservoir simulator in a forward simulation to generate a multi-segmented well model;
(b) processing outputs from the multi-segmented well model to generate intermediate partial derivatives of flow equations for the one or more wells and for the reservoir;
(c) combining the intermediate partial derivatives of the well flow equations and the reservoir flow equations in the reservoir simulator;
(d) solving an adjoint system of linear equations at regular time intervals to calculate a set of adjoint gradients of an objective function with respect to control parameters associated with the downhole valves;
(e) determining from the adjoint gradients a search direction;
(f) using the search direction to solve an optimization algorithm that maximizes the objective function using line-search methods;
(g) locating a local maximum along the search direction and updating the control parameters;
(h) using the new updated control parameters in the reservoir simulator to generate an updated multi-segmented well model;
(i) repeating steps (a)-(i) until the updated multi-segmented well model converges on a maximized value of the objective function; and
(j) adjusting control of the one or more wells in the reservoir based on the updated multi-segmented well model.

7. The program storage device of claim 6, wherein the control parameters comprise well production, injection rates, and injection pressures.

8. The program storage device of claim 6, wherein the control parameters comprise configurations of down-hole inflow control devices.

9. The program storage device of claim 6, wherein the maximized value of the objective function is a quantity of cumulative oil production subject to production constraints.

10. The program storage device of claim 6, wherein the set of adjoint gradients comprise pressure drop and fluid flow from the multi-segmented well model.

11. A system adapted for optimizing production of a reservoir having one or more wells having downhole valves, comprising:

apparatus adapted for:
running a reservoir simulator in a forward simulation to generate a multi-segmented well model;
processing outputs from the multi-segmented well model to generate intermediate partial derivatives of flow equations for the one or more wells and for the reservoir;
combining the intermediate partial derivatives of the well flow equations and the reservoir flow equations in the reservoir simulator;
solving an adjoint system of linear equations at regular time intervals to calculate a set of adjoint gradients of an objective function with respect to control parameters associated with the downhole valves;
determining from the adjoint gradients a search direction;
using the search direction to solve an optimization algorithm that maximizes the objective function using line-search methods;
locating a local maximum along the search direction and updating the control parameters;
further using the new updated control parameters in the reservoir simulator to generate an updated multi-segmented well model; and
repeating the processing, combining, solving, determining, using, locating, and further using functions performed by the apparatus until the updated multi-segmented well model converges on a maximized value of the objective function; and
adjusting control of the one or more wells in the reservoir based on the updated multi-segmented well model.

12. The system of claim 11, wherein the control parameters comprise well production, injection rates, and injection pressures.

13. The system of claim 11, wherein the control parameters comprise configurations of down-hole inflow control devices.

14. The system of claim 11, wherein the maximized value of the objective function is a quantity of cumulative oil production subject to production constraints.

15. The system of claim 11, wherein the set of adjoint gradients comprise pressure drop and fluid flow from the multi-segmented well model.

\* \* \* \* \*